(12) United States Patent
Hu et al.

(10) Patent No.: US 12,055,697 B2
(45) Date of Patent: Aug. 6, 2024

(54) CAMERA LENS GROUP

(71) Applicant: ZHEJIANG SUNNY OPTICS CO.,LTD., Zhejiang (CN)

(72) Inventors: Yabin Hu, Zhejiang (CN); Jian Zhang, Zhejiang (CN); Liefeng Zhao, Zhejiang (CN); Fujian Dai, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 615 days.

(21) Appl. No.: 17/317,848

(22) Filed: May 11, 2021

(65) Prior Publication Data

US 2021/0373300 A1 Dec. 2, 2021

(30) Foreign Application Priority Data

May 29, 2020 (CN) .......................... 202010472051.X

(51) Int. Cl.
*G02B 15/14* (2006.01)
*G02B 13/00* (2006.01)
*G02B 27/00* (2006.01)

(52) U.S. Cl.
CPC ..... *G02B 15/1421* (2019.08); *G02B 13/0045* (2013.01); *G02B 27/0025* (2013.01)

(58) Field of Classification Search
CPC ...................................................... G02B 9/10
See application file for complete search history.

(56) References Cited

U.S. PATENT DOCUMENTS 7,154,220 B2 * 12/2006 Schaepkens ......... H10K 50/844
313/506
2010/0182677 A1 * 7/2010 Wang ................. G02B 15/1425
359/356
2015/0070783 A1 * 3/2015 Hashimoto ........ G02B 13/0045
359/708
2015/0198791 A1 * 7/2015 Kubota .............. G02B 27/0025
359/689
2017/0059827 A1 * 3/2017 Kubota ..................... G02B 9/64
2019/0121102 A1   4/2019 Zhang et al.
2020/0363610 A1 * 11/2020 Ko ..................... G02B 13/0045

FOREIGN PATENT DOCUMENTS

CN 110542983 A 12/2019

OTHER PUBLICATIONS

The first examination report of family IN application No. 202114022348, issued on Feb. 25, 2022.

* cited by examiner

*Primary Examiner* — Robert E. Tallman
(74) *Attorney, Agent, or Firm* — Samson G. Yu

(57) ABSTRACT

The disclosure provides a camera lens group, which sequentially includes, from an object side to an image side along an optical axis: a first lens group with a positive refractive power, sequentially including, along the optical axis, a first lens, a second lens and a third lens with refractive power respectively; and a second lens group with a negative refractive power, sequentially including, the optical axis, a fourth lens, a fifth lens, a sixth lens and a seventh lens with refractive power respectively, wherein a total effective focal length f of the camera lens group and an entrance pupil diameter (EPD) of the camera lens group meet f/EPD<1.4; and an effective focal length f1 of the first lens and a spacing distance T34 of the third lens and the fourth lens on the optical axis meet 3.0<f1/T34<5.0.

19 Claims, 15 Drawing Sheets longitudinal aberration curve astigmatism curve

CAMERA LENS GROUP

CROSS-REFERENCE TO RELATED PRESENT APPLICATION(S)

The present application claims priority to and the benefit of Chinese Patent Present invention No. 202010472051.X, filed in the China National Intellectual Property Administration (CNIPA) on 29 May 2020, which is incorporated herein by reference in its entirety.

TECHNICAL FIELD

The disclosure relates to the field of optical elements, and particularly to a camera lens group.

BACKGROUND

At present, with the gradual increase of requirements of portable electronic products such as smart phones on imaging functions, portable electronic products such as smart phones have also make stricter requirements to the optical performance of imaging lenses and the diversity of functions. Meanwhile, with the popularization of multi-lens cameras, portrait shooting has become a standard configuration of portable electronic products such as a smart phone. Users are increasingly enthusiastic about photographic creations with portable electronic products such as smart phones rather than single lens reflex cameras. In addition, with the emergence of various Applications (APPs) with camera functions, portrait shooting has apparently been integrated into people's lives.

However, background blurring in portrait shooting of a present portable electronic product such as a smart phone is implemented mainly based on an algorithm. When a complex scenario is processed, a shooting effect is not so good, and an edge of a person and a background cannot be distinguished well, resulting in blurring of the edge of the person or an inadequate background blurring degree. Therefore, there is a certain gap with a single lens reflex camera in terms of portrait shooting.

Due to a limit of hardware such as a chip, development of portrait shooting of a portable electronic product such as a smart phone always stays on the aspects of hardware improvement, algorithm optimization and the like and no breakthroughs in principles have been made yet.

SUMMARY

Some embodiments of the disclosure provide a camera lens group, which sequentially includes, from an object side to an image side along an optical axis: a first lens group with a positive refractive power, sequentially including, along the optical axis, a first lens, a second lens and a third lens with refractive power respectively; and a second lens group with a negative refractive power, sequentially including, along the optical axis, a fourth lens, a fifth lens, a sixth lens and a seventh lens with refractive power respectively, wherein a total effective focal length f of the camera lens group and an entrance pupil diameter (EPD) of the camera lens group may meet f/EPD<1.4; and an effective focal length f1 of the first lens and a spacing distance T34 of the third lens and the fourth lens on the optical axis may meet 3.0<f1/T34<5.0.

In an implementation mode, an object-side surface of the first lens to an image-side surface of the seventh lens include at least one aspheric mirror surface.

In an implementation mode, the EPD of the camera lens group and a center thickness CT1 of the first lens on the optical axis may meet 2.5<EPD/CT1<3.0.

In an implementation mode, the total effective focal length f of the camera lens group may meet 7.0 mm<f<8.0 mm.

In an implementation mode, the total effective focal length f of the camera lens group and the effective focal length f1 of the first lens may meet 1.2<f/f1<1.5.

In an implementation mode, the total effective focal length f of the camera lens group and a combined focal length f45 of the fourth lens and the fifth lens may meet −0.5<f/f45<0.

In an implementation mode, a combined focal length f23 of the second lens and the third lens and the effective focal length f1 of the first lens may meet −3.0<f23/f1≤−2.0.

In an implementation mode, an effective focal length f2 of the second lens and an effective focal length f7 of the seventh lens may meet 0.5<f2/f7<1.2.

In an implementation mode, the total effective focal length f of the camera lens group, an effective focal length f3 of the third lens and an effective focal length f6 of the sixth lens may meet 0.2<f/f6-f/f3<0.5.

In an implementation mode, a center thickness CT7 of the seventh lens on the optical axis and a spacing distance T67 of the sixth lens and the seventh lens on the optical axis may meet 0.9<CT7/T67≤1.6.

In an implementation mode, a spacing distance T23 of the second lens and the third lens on the optical axis, a spacing distance T45 of the fourth lens and the fifth lens on the optical axis and a spacing distance T56 of the fifth lens and the sixth lens on the optical axis may meet 1.0<T56/(T23+T45)≤4.0.

In an implementation mode, the center thickness CT1 of the first lens on the optical axis and a sum ΣAT of spacing distances of any two adjacent lenses in the first lens to the seventh lens on the optical axis may meet 0.8<CT1/ΣAT<1.0.

In an implementation mode, the total effective focal length f of the camera lens group and a curvature radius R13 of an object-side surface of the seventh lens may meet −2.5<f/R13<−1.5.

In an implementation mode, a curvature radius R10 of an image-side surface of the fifth lens and a curvature radius R12 of an image-side surface of the sixth lens may meet −4.0<R12/R10<−1.5.

In an implementation mode, the total effective focal length f of the camera lens group, a curvature radius R3 of an object-side surface of the second lens and a curvature radius R4 of an image-side surface of the second lens may meet 2.5<f/(R3-R4)<3.5.

In an implementation mode, the total effective focal length f of the camera lens group, a curvature radius R5 of an object-side surface of the third lens and a curvature radius R6 of an image-side surface of the third lens may meet 0<f/R5-f/R6<0.5.

Another aspect of the disclosure provides a camera lens group, which sequentially includes, from an object side to an image side along an optical axis: a first lens group with a positive refractive power, sequentially including, along the optical axis, a first lens, a second lens and a third lens with refractive power respectively; and a second lens group with a negative refractive power, sequentially including, along the optical axis, a fourth lens, a fifth lens, a sixth lens and a seventh lens with refractive power respectively, wherein a center thickness CT1 of the first lens on the optical axis and a sum ΣAT of spacing distances of any two adjacent lenses in the first lens to the seventh lens on the optical axis may meet $0.8<CT1/\Sigma AT<1.0$.

According to the disclosure, the refractive power is configured reasonably, and optical parameters are optimized, so that the provided camera lens group is applicable to a portable electronic product, long in focal length, small and high in imaging quality.

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
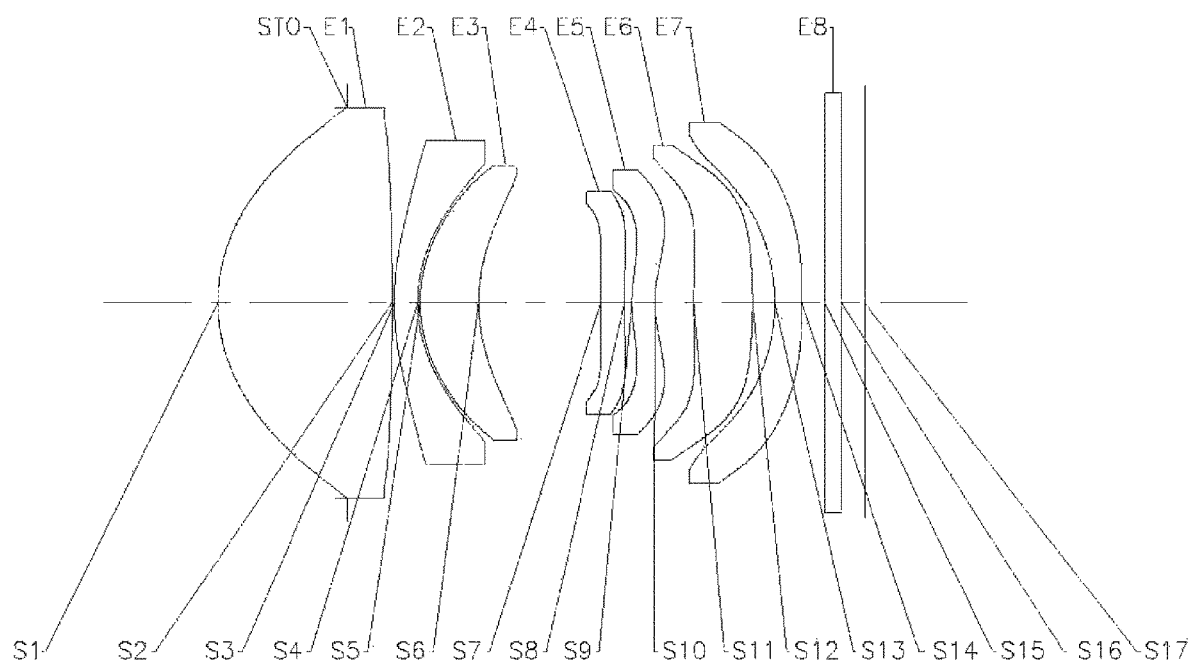
FIG. 1 is a structure diagram of a camera lens group according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

A camera lens group according to an exemplary implementation mode of the disclosure may include two lens groups, i.e., a first lens group that may sequentially include a first lens, a second lens and a third lens and a second lens group that may include a fourth lens, a fifth lens, a sixth lens and a seventh lens respectively. All the seven lenses may have refractive power. The seven lenses are sequentially arranged from an object side to an image side along an optical axis. In the first lens to the seventh lens, there may be a spacing distance between any two adjacent lenses.

In the exemplary implementation mode, the first lens group may have a positive refractive power, and the second lens group may have a negative refractive power.

In the exemplary implementation mode, the camera lens group according to the disclosure may meet $f/EPD<1.4$, wherein f is a total effective focal length of the camera lens group, and EPD is an entrance pupil diameter of the camera lens group. Meeting f/EPD<1.4 is favorable for achieving the characteristic of large aperture and further favorable for achieving an ultra-small-depth-of-field portrait lens shooting effect.

In the exemplary implementation mode, the camera lens group according to the disclosure may meet 3.0<f1/T34<5.0, wherein f1 is an effective focal length of the first lens, and T34 is a spacing distance of the third lens and the fourth lens on the optical axis. More specifically, f1 and T34 may further meet 3.5<f1/T34<4.2. 3.0<f1/T34<5.0 is met, so that an on-axis spherical aberration of the whole system may be reduced under the condition of ensuring that the first lens group has the positive refractive power and the second lens group has the negative refractive power.

In the exemplary implementation mode, the camera lens group according to the disclosure may meet 2.5<EPD/CT1<3.0, wherein EPD is the entrance pupil diameter of the camera lens group, and CT1 is a center thickness of the first lens on the optical axis. More specifically, EPD and CT1 may further meet 2.6<EPD/CT1<2.9. 2.5<EPD/CT1<3.0 is met, so that the manufacturability of the first lens may meet a requirement better.

In the exemplary implementation mode, the camera lens group according to the disclosure may meet 7.0 mm<f<8.0 mm, wherein f is the total effective focal length of the camera lens group. More specifically, f may further meet 7.7 mm<f<8.0 mm. 7.0 mm<f<8.0 mm is met, achievement of a smaller-depth-of-field portrait effect may be facilitated after increase of a focal length on one hand, and on the other hand, for a designed image surface size, 2× optical zooming may be implemented by 35 mm equivalent focal length conversion.

In the exemplary implementation mode, the camera lens group according to the disclosure may meet 1.2<f/f1<1.5, wherein f is the total effective focal length of the camera lens group, and f1 is the effective focal length of the first lens. More specifically, f and f1 may further meet 1.3<f/f1<1.5. 1.2<f/f1<1.5 is met, so that the first lens may bear positive refractive power reasonably, and correction of an aperture band related coma aberration of the system is facilitated.

In the exemplary implementation mode, the camera lens group according to the disclosure may meet −0.5<f/f45<0, wherein f is the total effective focal length of the camera lens group, and f45 is a combined focal length of the fourth lens and the fifth lens. −0.5<f/f45<0 is met, so that the fourth lens and the fifth lens may play a role in correcting astigmatism and coma aberration in a meridian direction.

In the exemplary implementation mode, the camera lens group according to the disclosure may meet −3.0<f23/f1≤−2.0, wherein f23 is a combined focal length of the second lens and the third lens, and f1 is the effective focal length of the first lens. More specifically, f23 and f1 may further meet −2.6<f23/f1≤−2.0. −3.0<f23/f1≤−2.0 is met, so that astigmatism of the system in a sagittal direction may be reduced.

In the exemplary implementation mode, the camera lens group according to the disclosure may meet 0.5<f2/f7<1.2, wherein f2 is an effective focal length of the second lens, and f7 is an effective focal length of the seventh lens. More specifically, f2 and f7 may further meet 0.6<f2/f7<1.2. 0.5<f2/f7<1.2 is met, so that a primary spherical aberration of the system may be reduced, and an optical distortion of the system may further be corrected.

In the exemplary implementation mode, the camera lens group according to the disclosure may meet 0<f/f6-f/f3<0.5, wherein f is the total effective focal length of the camera lens group, f3 is an effective focal length of the third lens, and f6 is an effective focal length of the sixth lens. 0<f/f6-f/f3<0.5 is met, so that two types of aberrations, i.e., a Petzval field curvature and the optical distortion, of the optical system may be reduced.

In the exemplary implementation mode, the camera lens group according to the disclosure may meet 0.9<CT7/T67≤1.6, wherein CT7 is a center thickness of the seventh lens on the optical axis, and T67 is a spacing distance of the sixth lens and the seventh lens on the optical axis. 0.9<CT7/T67≤1.6 is met, so that the sixth lens and the seventh lens may meet an assembling requirement of structurally matched arrangement.

In the exemplary implementation mode, the camera lens group according to the disclosure may meet 1.0<T56/(T23+T45)≤4.0, wherein T23 is a spacing distance of the second lens and the third lens on the optical axis, T45 is a spacing distance of the fourth lens and the fifth lens on the optical axis, and T56 is a spacing distance of the fifth lens and the sixth lens on the optical axis. More specifically, T56, T23 and T45 may further meet 1.1<T56/(T23+T45)≤4.0. 1.0<T56/(T23+T45)≤4.0 is met, so that an axial chromatic aberration of the system may be corrected.

In the exemplary implementation mode, the camera lens group according to the disclosure may meet 0.8<CT1/ΣAT<1.0, wherein CT1 is the center thickness of the first lens on the optical axis, and ΣAT is a sum of spacing distances of any two adjacent lenses in the first lens to the seventh lens on the optical axis. 0.8<CT1/ΣAT<1.0 is met, so that the problems of low manufacturability and the like may be solved.

In the exemplary implementation mode, the camera lens group according to the disclosure may meet −2.5<f/R13<−1.5, wherein f is the total effective focal length of the camera lens group, and R13 is a curvature radius of an object-side surface of the seventh lens. More specifically, f and R13 may further meet −2.4<f/R13<−1.6. −2.5<f/R13<−1.5 is met, so that it may be ensured that a surface type of the object-side surface of the seventh lens is in a reasonable forming machining range, and correction of the astigmatism of the system in the meridian direction is facilitated.

In the exemplary implementation mode, the camera lens group according to the disclosure may meet −4.0<R12/R10<−1.5, wherein R10 is a curvature radius of an image-side surface of the fifth lens, and R12 is a curvature radius of an image-side surface of the sixth lens. More specifically, R12 and R10 may further meet −3.8<R12/R10<−1.7. −4.0<R12/R10<−1.5 is met, so that ghost images generated by reflection between the fifth lens and the sixth lens in a half field of view (FOV) range may be improved.

In the exemplary implementation mode, the camera lens group according to the disclosure may meet 2.5<f/(R3-R4)<3.5, wherein f is the total effective focal length of the camera lens group, R3 is a curvature radius of an object-side surface of the second lens, and R4 is a curvature radius of an image-side surface of the second lens. More specifically, f, R3 and R4 may further meet 2.6<f/(R3-R4)<3.2. 2.5<f/(R3-R4)<3.5 is met, so that vector heights of the object-side surface and image-side surface of the second lens may be ensured, and the astigmatism of the system in the sagittal direction may be corrected.

In the exemplary implementation mode, the camera lens group according to the disclosure may meet 0<f/R5-f/R6<0.5, wherein f is the total effective focal length of the camera lens group, R5 is a curvature radius of an object-side surface of the third lens, and R6 is a curvature radius of an image-side surface of the third lens. More specifically, f, R5 and R6 may further meet 0.2<f/R5-f/R6<0.5. 0<f/R5-f/R6<0.5 is met, so that a shape of the third lens may be controlled effectively in a range required by a forming process, and the Petzval field curvature and spherical aberration of the system may be reduced.

In the exemplary implementation mode, the camera lens group according to the disclosure may further include a diaphragm arranged between the object side and the first lens. Optionally, the camera lens group may further include an optical filter configured to correct a chromatic aberration and/or protective glass configured to protect a photosensitive element on an imaging surface. The disclosure discloses a camera lens group with the characteristics of small size, large aperture, ultra-large focal length, high imaging quality and the like. The camera lens group according to the implementation mode of the disclosure may adopt multiple lenses, for example, the abovementioned seven lenses. The refractive power and surface types of each lens, the center thickness of each lens, on-axis distances between the lenses and the like may be reasonably configured to effectively converge incident light, reduce a Total Track Length (TTL) of the imaging lens, improve the machinability of the imaging lens and ensure that the camera lens group is more favorable for production and machining.

In the implementation mode of the disclosure, at least one of mirror surfaces of each lens is an aspheric mirror surface, namely at least one mirror surface in the object-side surface of the first lens to an image-side surface of the seventh lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspheric mirror surface. Optionally, both the object-side surface and image-side surface of each lens in the first lens, the second lens, the third lens, the fourth lens, the fifth lens, the sixth lens and the seventh lens are aspheric mirror surfaces.

However, those skilled in the art should know that the number of the lenses forming the camera lens group may be changed without departing from the technical solutions claimed in the disclosure to achieve each result and advantage described in the specification. For example, although descriptions are made in the implementation mode with seven lenses as an example, the camera lens group is not limited to seven lenses. If necessary, the camera lens group may further include another number of lenses.

Specific embodiments applied to the camera lens group of the implementation mode will further be described below with reference to the drawings.

Embodiment 1

A camera lens group according to embodiment 1 of the disclosure will be described below with reference to FIG. 1 to FIG. 2D. FIG. 1 is a structure diagram of a camera lens group according to embodiment 1 of the disclosure.

As shown in FIG. 1, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a concave surface, while an image-side surface S14 is a convex surface. The optical filter E8 has an object-side surface S15 and an image-side surface S16. Light from an object sequentially penetrates through each of the surfaces S1 to S16 and is finally imaged on the imaging surface S17.

Table 1 is a basic parameter table of the camera lens group of embodiment 1, and units of the curvature radius, the thickness and the focal length therein are all millimeter (mm).

TABLE 1

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.6477 | | | | |
| S1 | Aspheric | 3.1229 | 2.2200 | 1.546 | 56.11 | 5.54 | −0.2801 |
| S2 | Aspheric | −72.8607 | 0.0300 | | | | 31.0301 |
| S3 | Aspheric | 5.6274 | 0.2950 | 1.678 | 19.25 | −8.31 | 1.0066 |
| S4 | Aspheric | 2.7547 | 0.0300 | | | | −0.2579 |
| S5 | Aspheric | 2.6469 | 0.7418 | 1.546 | 56.11 | 21.25 | −1.0036 |
| S6 | Aspheric | 3.0898 | 1.5595 | | | | −1.9146 |
| S7 | Aspheric | 717.3232 | 0.3000 | 1.666 | 20.40 | −102.77 | −99.0000 |
| S8 | Aspheric | 62.5127 | 0.0935 | | | | 99.0000 |
| S9 | Aspheric | 3.0613 | 0.2900 | 1.546 | 56.11 | −21.40 | −29.9226 |
| S10 | Aspheric | 2.3444 | 0.4931 | | | | −16.0663 |
| S11 | Aspheric | 30.7085 | 0.7468 | 1.678 | 19.25 | 10.07 | −99.0000 |

TABLE 1-continued

| Surface number | Surface type | Curvature radius | Thickness/ distance | Material Refractive index | Abbe number | Focal length | Conic coefficient |
|---|---|---|---|---|---|---|---|
| S12 | Aspheric | −8.6831 | 0.2813 | | | | 8.3088 |
| S13 | Aspheric | −3.5231 | 0.3420 | 1.536 | 55.74 | −7.52 | 0.2568 |
| S14 | Aspheric | −28.6662 | 0.2927 | | | | −99.0000 |
| S15 | Spherical | Infinite | 0.2111 | 1.517 | 64.17 | | |
| S16 | Spherical | Infinite | 0.2967 | | | | |
| S17 | Spherical | Infinite | | | | | |

In the example, a total effective focal length f of the camera lens group is 7.80 mm, a TTL (i.e., a distance from the object-side surface S1 of the first lens E1 to the imaging surface S17 of the camera lens group on an optical axis) of the camera lens group is 8.22 mm, and a maximum field of view (FOV) of the camera lens group is 44.5°.

In embodiment 1, both the object-side surface and image-side surface of any lens in the first lens E1 to the seventh lens E7 are aspheric surfaces, and a surface type x of each aspheric lens may be defined through, but not limited to, the following aspheric surface formula:

$$x = \frac{ch^2}{1 + \sqrt{1 - (k+1)c^2 h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and $A_i$ is a correction coefficient of the i-th order of the aspheric surface. The following Tables 2-1 and 2-2 show high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$ and $A_{28}$ applied to the aspheric mirror surfaces S1-S14 in embodiment 1.

TABLE 2-1

| Surface number | A4 | A6 | A8 | A10 | A12 | A14 | A16 |
|---|---|---|---|---|---|---|---|
| S1 | −1.2420E−01 | −5.6181E−02 | −2.0490E−02 | −5.9822E−03 | −1.5356E−03 | −4.7494E−04 | −2.3010E−04 |
| S2 | −3.9110E−02 | −5.5415E−03 | −3.5660E−03 | −3.5662E−04 | −3.6599E−04 | −1.7039E−04 | 6.9519E−05 |
| S3 | −2.3540E−01 | 1.5180E−03 | 8.0198E−03 | −3.4622E−03 | 4.7328E−04 | −3.4635E−04 | 2.5584E−04 |
| S4 | −8.4379E−02 | −2.6722E−02 | 4.6823E−03 | −3.6070E−03 | −8.1890E−04 | −6.3741E−04 | 3.8309E−04 |
| S5 | 8.3921E−02 | 2.0333E−02 | 3.0511E−03 | −2.6318E−03 | −2.4111E−03 | −1.7082E−03 | −4.1732E−04 |
| S6 | −9.1150E−02 | −2.6204E−03 | −5.5394E−03 | −2.1176E−03 | −7.9159E−04 | −2.4573E−04 | −8.1295E−05 |
| S7 | −1.2397E−01 | −4.2643E−02 | −3.7035E−04 | −6.6198E−04 | 2.8039E−04 | −8.6346E−05 | 6.7875E−05 |
| S8 | −1.5919E−01 | −4.5514E−02 | 6.1681E−03 | 1.6130E−03 | 8.9417E−04 | −2.1423E−04 | 7.0046E−04 |
| S9 | −4.3356E−01 | −1.4792E−02 | −3.8024E−03 | −2.9437E−03 | 1.0068E−03 | −1.6199E−03 | 1.2556E−03 |
| S10 | −6.3268E−01 | −4.4341E−03 | 1.3550E−02 | −2.5945E−03 | 1.4251E−03 | −2.3021E−03 | 7.4394E−04 |
| S11 | −6.0121E−01 | −3.2027E−02 | 3.8912E−02 | 3.3804E−03 | −5.5154E−04 | −2.2051E−03 | 2.5556E−04 |
| S12 | −5.9839E−01 | −5.8180E−02 | 5.9844E−02 | −2.1052E−03 | 3.6240E−03 | −1.7401E−03 | −6.5416E−04 |
| S13 | 3.1373E−02 | 1.2947E−01 | 4.5671E−02 | −6.4813E−03 | −6.8937E−03 | −4.3368E−03 | 6.2973E−05 |
| S14 | −1.1440E+00 | 8.8761E−02 | −3.8462E−02 | 3.6188E−02 | −3.4042E−03 | −4.7591E−04 | 3.5325E−04 |

TABLE 2-2

| Surface number | A18 | A20 | A22 | A24 | A26 | A28 |
|---|---|---|---|---|---|---|
| S1 | −1.5480E−04 | −7.3243E−05 | −2.9108E−05 | 4.4527E−06 | 4.3528E−06 | 0.0000E+00 |
| S2 | −2.3784E−06 | 6.5799E−05 | −3.1163E−06 | 1.2985E−05 | 6.0819E−06 | 0.0000E+00 |
| S3 | 3.5551E−05 | 9.2580E−05 | 6.3046E−07 | −3.8379E−06 | 6.4191E−06 | 0.0000E+00 |
| S4 | 6.4391E−05 | 2.0677E−04 | 4.9400E−05 | −5.1670E−05 | 1.2936E−05 | 0.0000E+00 |
| S5 | −3.6843E−04 | 2.7244E−05 | 4.1813E−05 | −3.4742E−05 | 1.4346E−05 | 0.0000E+00 |
| S6 | −8.5217E−07 | 4.6320E−05 | 3.6316E−05 | 1.0175E−05 | 4.1725E−07 | 0.0000E+00 |

TABLE 2-2-continued

| Surface number | A18 | A20 | A22 | A24 | A26 | A28 |
| --- | --- | --- | --- | --- | --- | --- |
| S7 | −1.6242E−05 | 1.0315E−05 | −1.1236E−06 | 1.7081E−06 | 2.2562E−06 | 0.0000E+00 |
| S8 | −2.7217E−05 | 1.3278E−04 | −5.2209E−05 | 1.1748E−06 | −6.5499E−06 | 0.0000E+00 |
| S9 | −4.4887E−05 | 2.5941E−04 | −9.9005E−05 | −3.5264E−06 | −2.8890E−05 | −3.6475E−06 |
| S10 | −1.5200E−03 | −2.6857E−04 | −2.8880E−04 | 1.2414E−04 | 2.8648E−05 | 4.3443E−05 |
| S11 | −2.0928E−04 | −4.4749E−05 | 1.1560E−04 | 1.1072E−04 | 8.3045E−06 | −1.8343E−05 |
| S12 | −5.8841E−04 | 8.6975E−04 | 2.0906E−04 | −2.2481E−04 | −1.2154E−04 | −5.3178E−05 |
| S13 | 8.5211E−04 | 4.3637E−04 | −1.7576E−03 | −1.3214E−05 | 5.6098E−04 | −1.4635E−04 |
| S14 | 4.9330E−04 | 9.0504E−04 | −3.5389E−05 | 1.7235E−04 | −1.6717E−04 | −4.0032E−04 |

Figure 2A:
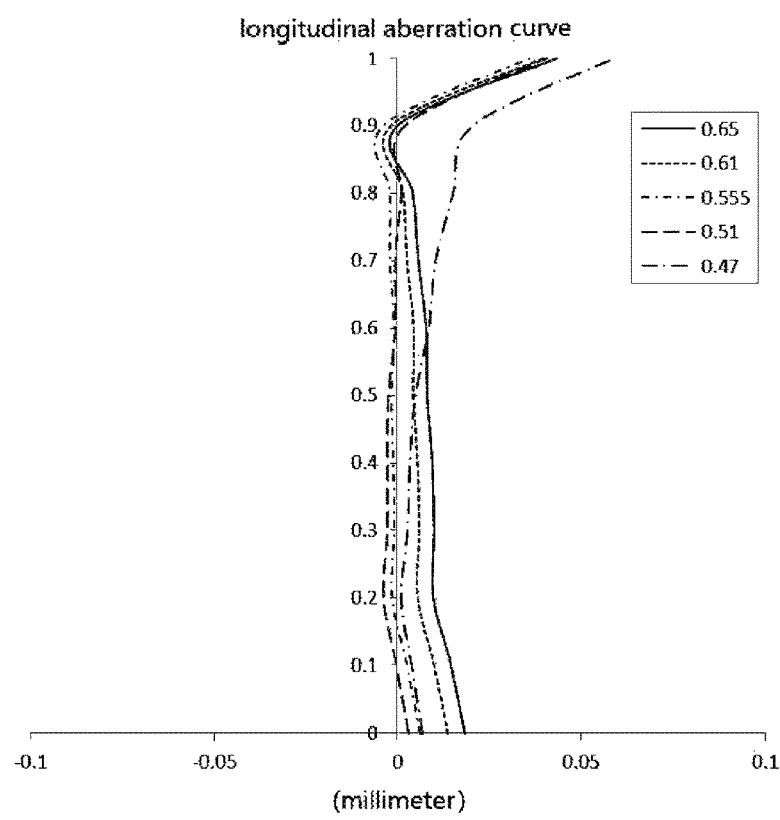
FIG. 2A to FIG. 2D show a longitudinal aberration curve, an astigmatism curve, a distortion curve and a lateral color curve of a camera lens group according to embodiment 1 respectively.
Figure 2B:
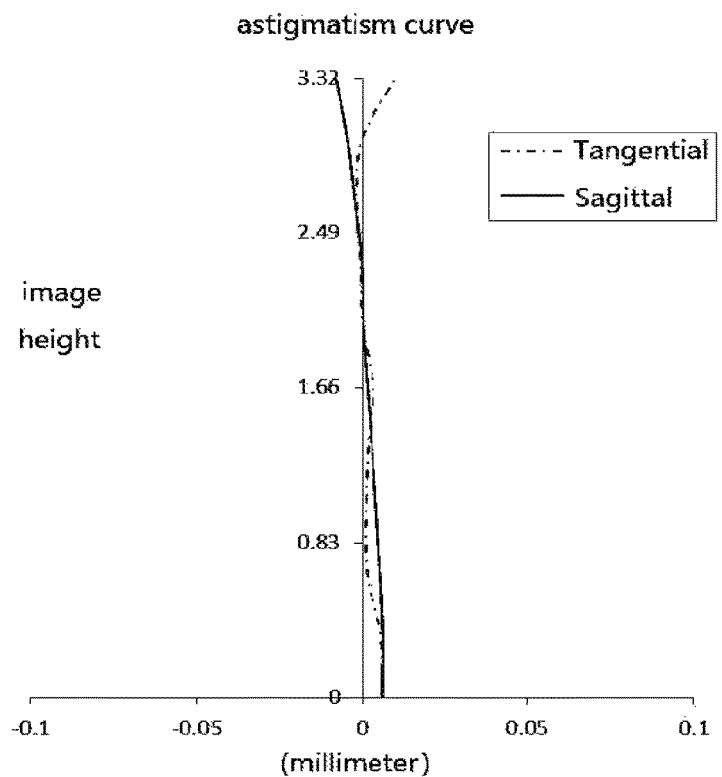
Figure 2C:
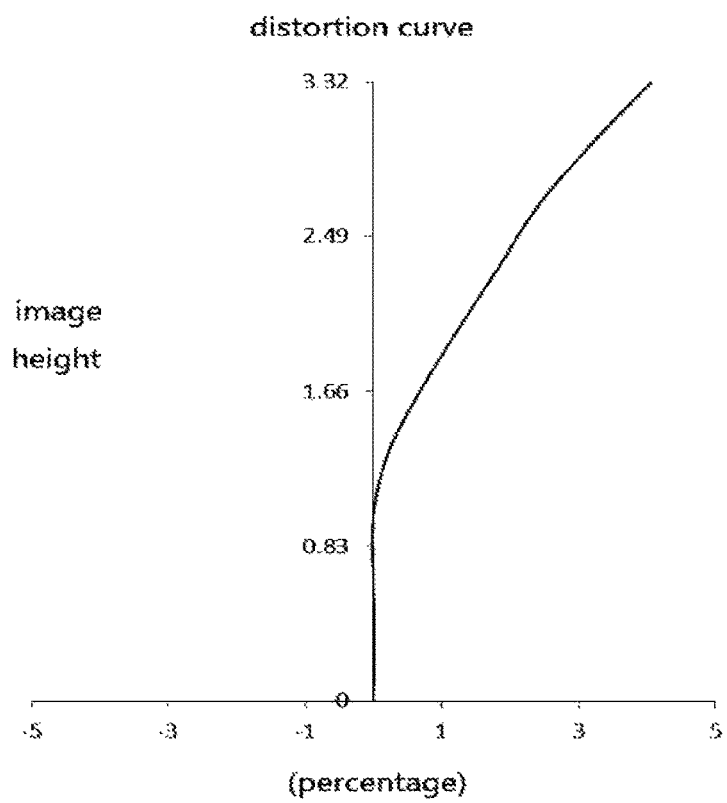
Figure 2D:
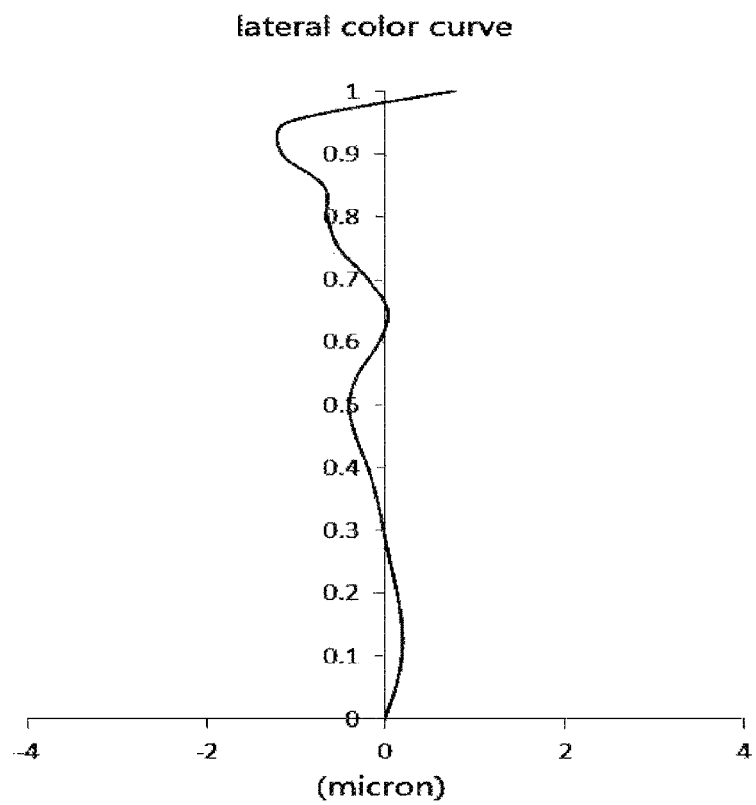

FIG. 2A shows a longitudinal aberration curve of the camera lens group according to embodiment 1 to represent deviation of a convergence focal point after light of different wavelengths passes through the lens. FIG. 2B shows an astigmatism curve of the camera lens group according to embodiment 1 to represent a tangential image surface curvature and a sagittal image surface curvature. FIG. 2C shows a distortion curve of the camera lens group according to embodiment 1 to represent distortion values corresponding to different image heights. FIG. 2D shows a lateral color curve of the camera lens group according to embodiment 1 to represent deviation of different image heights on the imaging surface after the light passes through the lens. According to FIG. 2A to FIG. 2D, it can be seen that high imaging quality of the camera lens group provided in embodiment 1 may be achieved.

Embodiment 2

Figure 3:
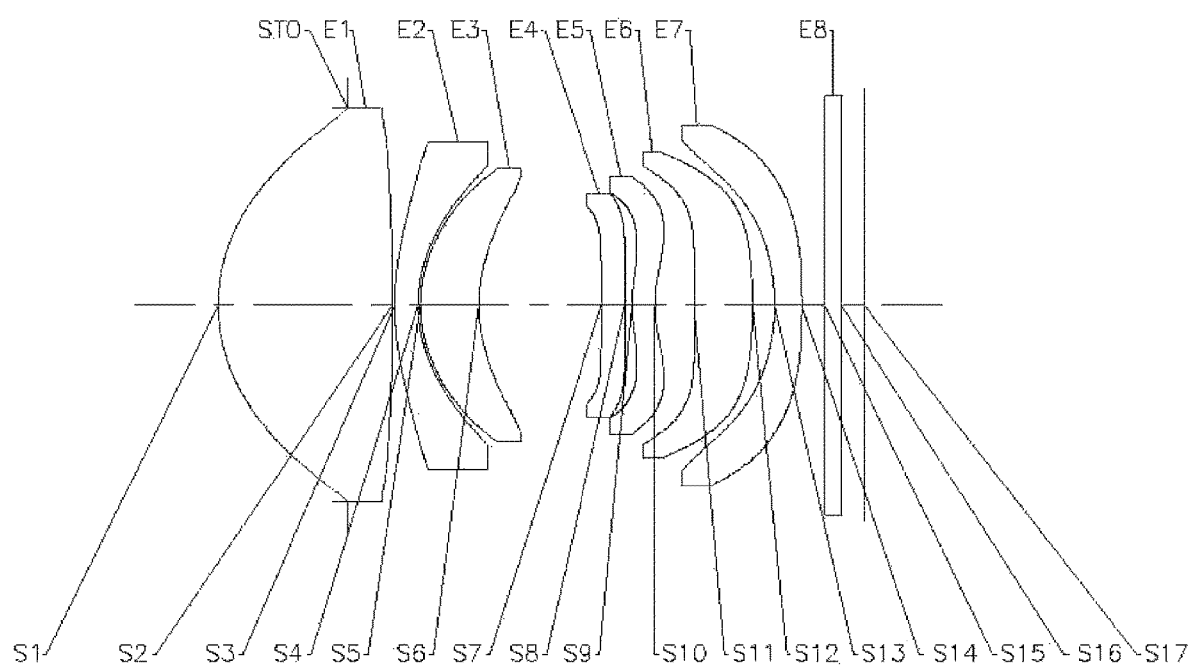
FIG. 3 is a structure diagram of a camera lens group according to embodiment 2 of the disclosure.

A camera lens group according to embodiment 2 of the disclosure will be described below with reference to FIG. 3 to FIG. 4D. In the embodiment and the following embodiments, part of descriptions similar to those above embodiment are omitted for simplicity. FIG. 3 is a structure diagram of a camera lens group according to embodiment 2 of the disclosure.

As shown in FIG. 3, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a concave surface, while an image-side surface S14 is a convex surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the camera lens group is 7.80 mm, a TTL of the camera lens group is 8.22 mm, and a maximum field of view (FOV) of the camera lens group is 44.5°.

Table 3 is a basic parameter table of the camera lens group of embodiment 2, and units of the curvature radius, the thickness and the focal length therein are all millimeter (mm). Tables 4-1 and 4-2 show high-order coefficients applied to each aspheric mirror surface in embodiment 2. A surface type of each aspheric surface may be defined by formula (1) given in embodiment 1.

TABLE 3

| Surface number | Surface type | Curvature radius | Thickness/distance | Material Refractive index | Material Abbe number | Focal length | Conic coefficient |
| --- | --- | --- | --- | --- | --- | --- | --- |
| OBJ | Spherical | Infinite | Infinite | | | | |
| STO | Spherical | Infinite | −1.6477 | | | | |
| S1 | Aspheric | 3.1374 | 2.2200 | 1.546 | 56.11 | 5.51 | −0.2788 |
| S2 | Aspheric | −55.1809 | 0.0300 | | | | 17.7136 |
| S3 | Aspheric | 5.6047 | 0.2950 | 1.678 | 19.25 | −8.13 | 1.0496 |
| S4 | Aspheric | 2.7191 | 0.0300 | | | | −0.2492 |
| S5 | Aspheric | 2.5203 | 0.7418 | 1.546 | 56.11 | 21.81 | −0.9823 |
| S6 | Aspheric | 2.8646 | 1.5595 | | | | −1.7973 |
| S7 | Aspheric | −87.4777 | 0.3000 | 1.666 | 20.40 | −120.70 | −99.0000 |
| S8 | Aspheric | 1000.7637 | 0.0935 | | | | 99.0000 |
| S9 | Aspheric | 3.0573 | 0.2900 | 1.546 | 56.11 | −24.54 | −29.5669 |
| S10 | Aspheric | 2.4059 | 0.4931 | | | | −17.3603 |
| S11 | Aspheric | 61.1285 | 0.7468 | 1.678 | 19.25 | 10.23 | −99.0000 |
| S12 | Aspheric | −7.7748 | 0.2813 | | | | 8.7492 |
| S13 | Aspheric | −3.4044 | 0.3420 | 1.536 | 55.74 | −7.75 | 0.2672 |
| S14 | Aspheric | −19.4477 | 0.2927 | | | | −99.0000 |
| S15 | Spherical | Infinite | 0.2111 | 1.517 | 64.17 | | |

TABLE 3-continued

| Surface number | Surface type | Curvature radius | Thickness/ distance | Material Refractive index | Abbe number | Focal length | Conic coefficient |
|---|---|---|---|---|---|---|---|
| S16 | Spherical | Infinite | 0.2967 | | | | |
| S17 | Spherical | Infinite | | | | | |

TABLE 4-1

| Surface number | A4 | A6 | A8 | A10 | A12 | A14 | A16 |
|---|---|---|---|---|---|---|---|
| S1 | −1.2137E−01 | −5.6223E−02 | −2.0800E−02 | −6.3722E−03 | −1.7644E−03 | −5.8379E−04 | −2.4910E−04 |
| S2 | −3.8337E−02 | −4.6115E−03 | −4.5691E−03 | −4.9614E−04 | −2.5622E−04 | −2.9597E−04 | 1.3773E−05 |
| S3 | −2.3362E−01 | 2.8085E−03 | 9.7546E−03 | −4.4010E−03 | 8.4802E−04 | −6.0301E−04 | 1.4778E−04 |
| S4 | −8.2876E−02 | −2.4789E−02 | 6.5641E−03 | −4.8922E−03 | −1.8533E−03 | −1.8897E−03 | −5.2845E−05 |
| S5 | 8.7089E−02 | 2.4902E−02 | 3.1373E−03 | −2.8190E−03 | −3.3850E−03 | −3.4016E−03 | −1.4797E−03 |
| S6 | −8.5903E−02 | −5.7138E−03 | −8.6877E−03 | −3.1340E−03 | −1.3719E−03 | −5.1068E−04 | −3.5794E−05 |
| S7 | −1.1440E−01 | −4.2549E−02 | −6.8810E−04 | −1.0000E−03 | 2.7760E−04 | −8.8760E−05 | 9.0212E−05 |
| S8 | −1.5408E−01 | −4.1587E−02 | 5.0979E−03 | 5.1829E−05 | 4.2772E−04 | −2.2386E−04 | 5.6399E−04 |
| S9 | −4.4235E−01 | −1.6477E−02 | −4.5237E−03 | −5.9956E−03 | −7.8213E−04 | −1.9691E−03 | 7.8994E−04 |
| S10 | −7.2336E−01 | −3.5263E−02 | 7.7119E−03 | −2.9541E−03 | 3.9728E−03 | 3.2605E−04 | 1.7701E−03 |
| S11 | −7.4363E−01 | −6.8128E−02 | 2.7040E−02 | 1.1273E−02 | 5.0657E−03 | 6.4992E−04 | 4.3317E−04 |
| S12 | −6.7313E−01 | −7.9523E−02 | 4.4804E−02 | 9.7714E−03 | 1.3792E−02 | 4.4452E−03 | 2.2126E−03 |
| S13 | 2.3179E−02 | 1.0019E−01 | 7.0822E−02 | −2.0775E−05 | 3.4872E−03 | −4.1876E−03 | −2.7077E−03 |
| S14 | −1.1964E+00 | 5.4427E−03 | −2.7794E−02 | 2.3261E−02 | 1.0600E−02 | 7.8612E−03 | 3.6718E−03 |

TABLE 4-2

| Surface number | A18 | A20 | A22 | A24 | A26 | A28 |
|---|---|---|---|---|---|---|
| S1 | −1.8566E−04 | −1.0626E−04 | −6.8274E−05 | −1.8154E−05 | −1.0123E−05 | 0.0000E+00 |
| S2 | −5.4658E−05 | 5.6165E−05 | −2.6656E−05 | 1.3525E−05 | −6.0066E−06 | 0.0000E+00 |
| S3 | 3.4312E−05 | 1.5935E−04 | −4.7460E−05 | −6.2936E−05 | −7.4216E−06 | 0.0000E+00 |
| S4 | 3.0103E−04 | 7.0796E−04 | −1.5833E−04 | −3.5991E−04 | −1.3882E−04 | 0.0000E+00 |
| S5 | −5.4453E−04 | 6.5335E−04 | 2.6999E−04 | −9.4465E−05 | −9.3715E−05 | 0.0000E+00 |
| S6 | 1.5017E−04 | 1.1048E−04 | 4.8025E−06 | −4.3829E−05 | −1.1186E−05 | 0.0000E+00 |
| S7 | −1.7635E−05 | 1.8181E−05 | −6.2355E−06 | 4.0261E−07 | 6.6789E−07 | 0.0000E+00 |
| S8 | −1.2981E−04 | 8.0731E−05 | −7.4736E−05 | 2.2792E−05 | −1.8339E−06 | 0.0000E+00 |
| S9 | −2.1592E−04 | 1.8334E−04 | −1.0587E−04 | 7.3367E−06 | −2.2065E−05 | −3.6475E−06 |
| S10 | −1.1404E−03 | −1.8520E−04 | −2.9315E−04 | 9.7668E−05 | 8.6313E−07 | 4.3443E−05 |
| S11 | −1.0685E−03 | −2.4450E−04 | 3.9874E−04 | 3.1923E−04 | 7.1941E−05 | −1.8343E−05 |
| S12 | −3.7169E−03 | −2.6496E−03 | −1.1775E−03 | −5.2658E−04 | −2.0400E−04 | −5.3178E−05 |
| S13 | −4.9453E−03 | 2.2985E−03 | 4.5841E−04 | −6.4432E−04 | −3.3304E−04 | −1.4635E−04 |
| S14 | −2.1043E−03 | −8.6836E−04 | −1.8269E−03 | −8.4412E−04 | −5.0790E−04 | −4.0032E−04 |

Figure 4A:
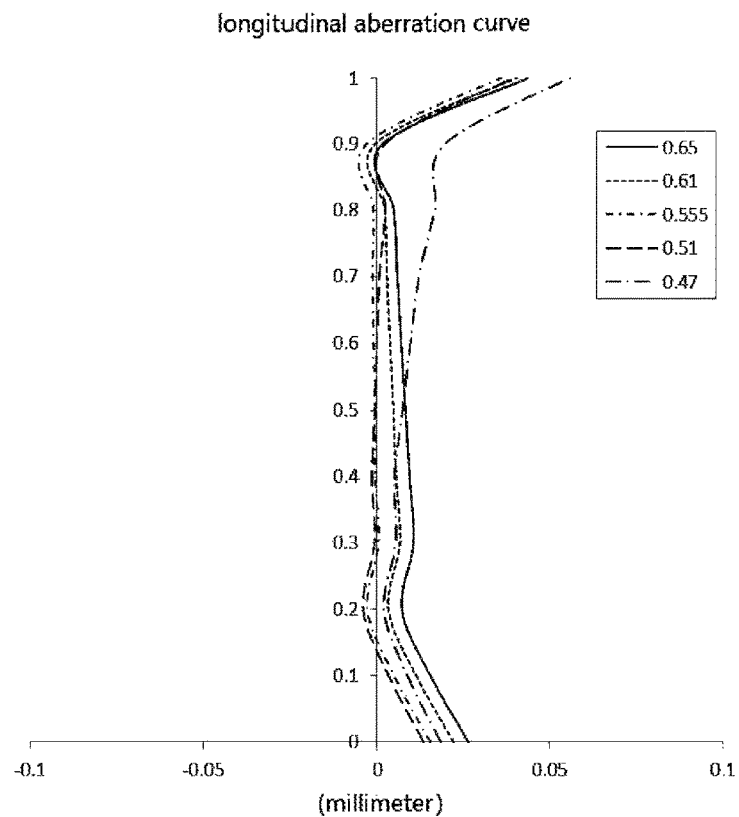
FIG. 4A to FIG. 4D show a longitudinal aberration curve, an astigmatism curve, a distortion curve and a lateral color curve of a camera lens group according to embodiment 2 respectively.
Figure 4B:
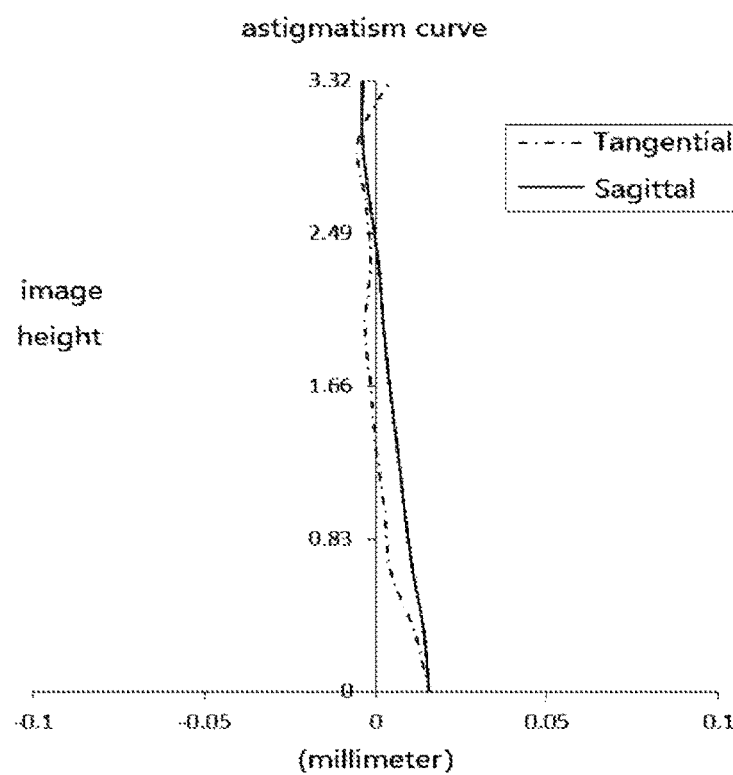
Figure 4C:
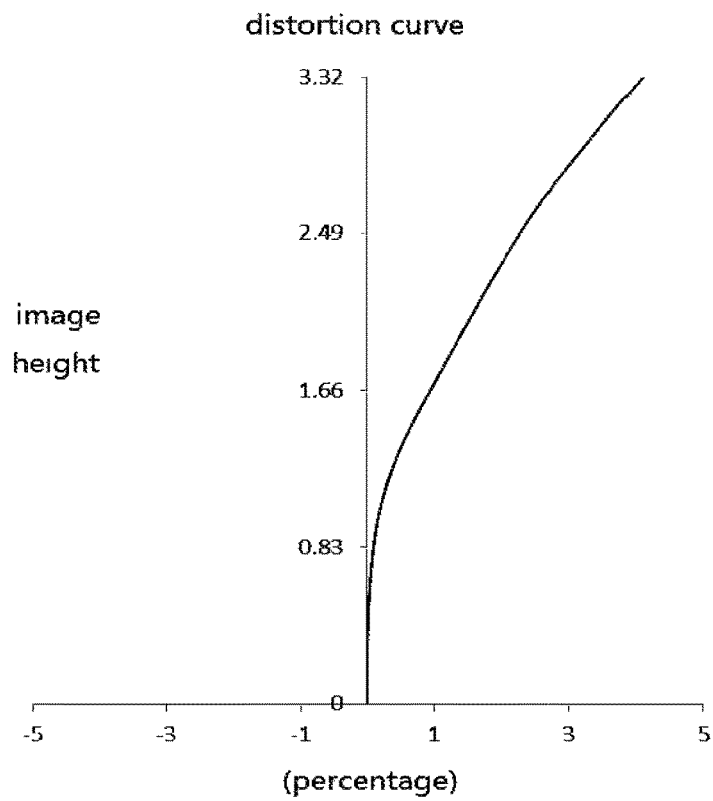
Figure 4D:
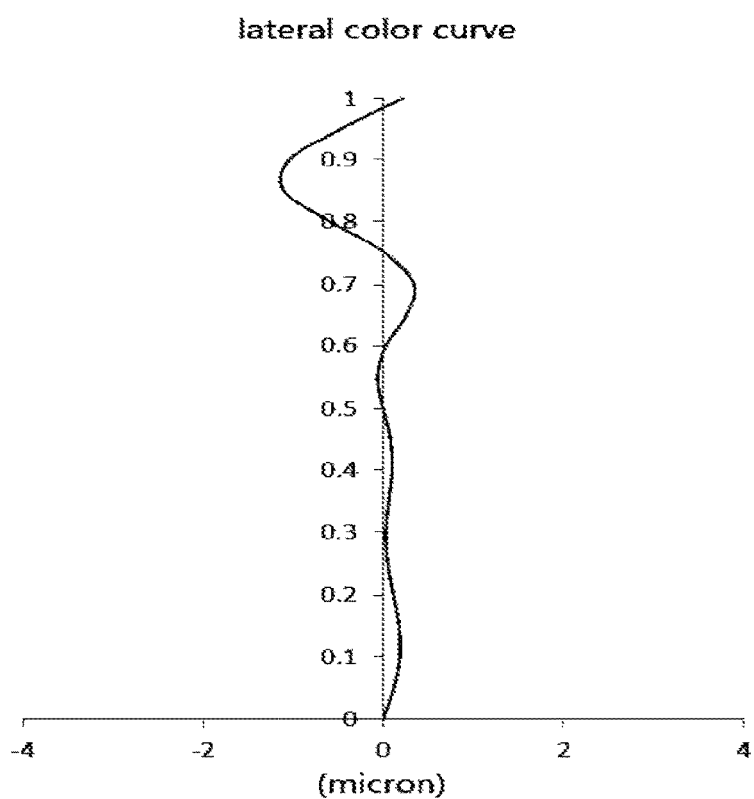

FIG. 4A shows a longitudinal aberration curve of the camera lens group according to embodiment 2 to represent deviation of a convergence focal point after light of different wavelengths passes through the lens. FIG. 4B shows an astigmatism curve of the camera lens group according to embodiment 2 to represent a tangential image surface curvature and a sagittal image surface curvature. FIG. 4C shows a distortion curve of the camera lens group according to embodiment 2 to represent distortion values corresponding to different image heights. FIG. 4D shows a lateral color curve of the camera lens group according to embodiment 2 to represent deviation of different image heights on the imaging surface after the light passes through the lens. According to FIG. 4A to FIG. 4D, it can be seen that high imaging quality of the camera lens group provided in embodiment 2 may be achieved.

Embodiment 3

Figure 5:
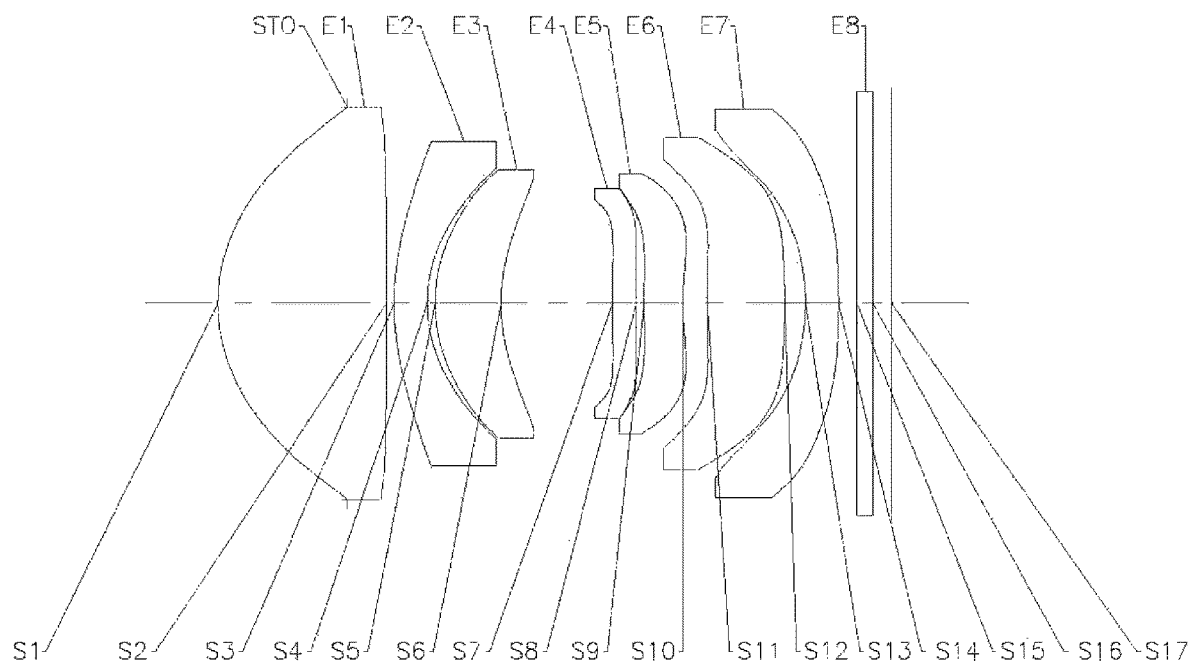
FIG. 5 is a structure diagram of a camera lens group according to embodiment 3 of the disclosure.

A camera lens group according to embodiment 3 of the disclosure will be described below with reference to FIG. 5 to FIG. 6D. FIG. 5 is a structure diagram of a camera lens group according to embodiment 3 of the disclosure.

As shown in FIG. 5, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a concave surface, while an image-side surface S14 is a convex surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the camera lens group is 7.83 mm, a TTL of the camera lens group is 8.57 mm, and a maximum field of view (FOV) of the camera lens group is 45.0°.

Table 5 is a basic parameter table of the camera lens group of embodiment 3, and units of the curvature radius, the thickness and the focal length therein are all millimeter (mm). Tables 6-1 and 6-2 show high-order coefficients applied to each aspheric mirror surface in embodiment 3. A surface type of each aspheric surface may be defined by formula (1) given in embodiment 1.

TABLE 5

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.6477 | | | | |
| S1 | Aspheric | 3.1739 | 2.1441 | 1.546 | 56.11 | 5.84 | −0.2693 |
| S2 | Aspheric | 598.9495 | 0.1000 | | | | −98.9038 |
| S3 | Aspheric | 5.1935 | 0.4200 | 1.678 | 19.25 | −8.78 | 0.9890 |
| S4 | Aspheric | 2.6823 | 0.1006 | | | | −0.2205 |
| S5 | Aspheric | 2.9481 | 0.8368 | 1.546 | 56.11 | 21.69 | −0.9616 |
| S6 | Aspheric | 3.5321 | 1.4196 | | | | −1.8285 |
| S7 | Aspheric | 30.9165 | 0.3013 | 1.666 | 20.40 | 46.84 | 97.9815 |
| S8 | Aspheric | 3218.7588 | 0.1000 | | | | 48.1416 |
| S9 | Aspheric | 19.2102 | 0.4931 | 1.546 | 56.11 | −16.01 | 98.2875 |
| S10 | Aspheric | 5.9517 | 0.3097 | | | | −32.8846 |
| S11 | Aspheric | 28.9577 | 0.9838 | 1.678 | 19.25 | 13.04 | −98.7650 |
| S12 | Aspheric | −12.5385 | 0.2619 | | | | 14.4524 |
| S13 | Aspheric | −3.6175 | 0.4200 | 1.536 | 55.74 | −8.60 | 0.3019 |
| S14 | Aspheric | −17.3920 | 0.2339 | | | | −83.5804 |
| S15 | Spherical | Infinite | 0.2111 | 1.517 | 64.17 | | |
| S16 | Spherical | Infinite | 0.2379 | | | | |
| S17 | Spherical | Infinite | | | | | |

TABLE 6-1

| Surface number | A4 | A6 | A8 | A10 | A12 | A14 | A16 |
|---|---|---|---|---|---|---|---|
| S1 | −1.1394E−01 | −4.9278E−02 | −1.8784E−02 | −6.1420E−03 | −1.9729E−03 | −6.3923E−04 | −2.3769E−04 |
| S2 | −4.9238E−02 | −7.4668E−03 | −2.4470E−03 | −9.4509E−04 | −5.7354E−05 | −1.9170E−04 | 5.1213E−05 |
| S3 | −2.3730E−01 | 1.7813E−03 | 4.7267E−03 | −1.4069E−03 | 4.1100E−04 | −1.2487E−04 | 1.2264E−04 |
| S4 | −7.5787E−02 | −2.0509E−02 | 2.0821E−03 | −3.8561E−03 | −1.6599E−03 | −9.2848E−04 | 5.1258E−04 |
| S5 | 8.6987E−02 | 1.1339E−02 | 6.9413E−03 | −1.6587E−03 | −2.5931E−03 | −2.2382E−03 | −7.2887E−04 |
| S6 | −8.7923E−02 | −9.5505E−03 | −2.8468E−03 | −2.4195E−03 | −1.4627E−03 | −9.1963E−04 | −4.2356E−04 |
| S7 | −1.3552E−01 | −3.7109E−02 | −2.3956E−03 | −6.1558E−04 | 4.1975E−04 | −2.0838E−04 | 1.3049E−04 |
| S8 | −1.4994E−01 | −4.6499E−02 | 7.9960E−03 | 7.2369E−05 | 1.6752E−03 | −1.4937E−03 | 9.1841E−04 |
| S9 | −4.1843E−01 | −1.0826E−02 | 5.2034E−04 | −4.1614E−03 | 1.6731E−03 | −1.5671E−03 | 1.6619E−03 |
| S10 | −7.2937E−01 | −2.8702E−02 | 1.0065E−02 | −6.3597E−03 | 3.2840E−03 | 5.5534E−04 | 1.9481E−03 |
| S11 | −6.4497E−01 | −2.2660E−02 | 3.1611E−02 | −5.1001E−03 | 3.2166E−03 | −3.4739E−04 | −2.5270E−04 |
| S12 | −7.0518E−01 | −5.0858E−02 | 4.2576E−03 | −5.3148E−03 | 2.5850E−03 | −2.5305E−03 | −1.1590E−03 |
| S13 | 3.9149E−02 | 9.2083E−02 | 5.2741E−02 | −1.1666E−02 | −1.7468E−03 | −2.3046E−03 | 3.9165E−03 |
| S14 | −8.1326E−01 | 2.6897E−02 | −3.8409E−02 | 1.5951E−02 | 5.2396E−03 | 2.5727E−03 | 3.3625E−03 |

TABLE 6-2

| Surface number | A18 | A20 | A22 | A24 | A26 | A28 |
|---|---|---|---|---|---|---|
| S1 | −7.5083E−05 | −1.9008E−05 | 5.2886E−06 | 9.7813E−06 | 6.3284E−06 | 0.0000E+00 |
| S2 | −1.9846E−05 | −2.2933E−08 | −8.4585E−07 | −4.9916E−06 | 4.6238E−06 | 0.0000E+00 |
| S3 | 2.7688E−05 | −2.2750E−05 | 7.4584E−06 | −8.7276E−06 | 1.2199E−05 | 0.0000E+00 |
| S4 | 6.5112E−04 | 2.5553E−04 | 6.7569E−05 | 6.3047E−06 | 2.0862E−05 | 0.0000E+00 |
| S5 | 5.8426E−05 | 9.2496E−05 | 6.3370E−05 | 1.0940E−05 | 3.1148E−05 | 0.0000E+00 |
| S6 | −2.4273E−04 | −1.1317E−04 | −8.2881E−05 | −3.4234E−05 | −2.3337E−05 | 0.0000E+00 |
| S7 | −5.0073E−05 | 4.1119E−05 | −2.3202E−05 | 1.0492E−05 | −4.3029E−06 | 5.7342E−07 |
| S8 | −8.3099E−05 | 1.8424E−04 | −1.3628E−04 | 4.2256E−05 | −1.4061E−05 | 4.3420E−06 |
| S9 | 3.0319E−04 | 2.7061E−04 | −1.1804E−04 | 4.5812E−05 | 2.3195E−05 | −1.2890E−06 |
| S10 | −9.9330E−05 | 1.9678E−04 | −1.9269E−06 | 8.5600E−05 | −2.3136E−05 | −2.2077E−06 |
| S11 | −7.3512E−04 | 3.7986E−04 | 2.0945E−04 | −9.3084E−06 | −1.3366E−04 | −1.8343E−05 |
| S12 | −4.7296E−04 | 1.1816E−03 | 2.7683E−04 | −2.1236E−04 | 2.3143E−05 | −5.3178E−05 |

TABLE 6-2-continued

| Surface number | A18 | A20 | A22 | A24 | A26 | A28 |
|---|---|---|---|---|---|---|
| S13 | 1.3120E−03 | 3.0927E−04 | −2.0300E−03 | −1.2440E−04 | 7.2721E−04 | −1.4635E−04 |
| S14 | −1.4783E−03 | −4.6058E−04 | −1.9725E−03 | −7.7302E−04 | −8.9058E−04 | −4.0032E−04 |

Figure 6A:
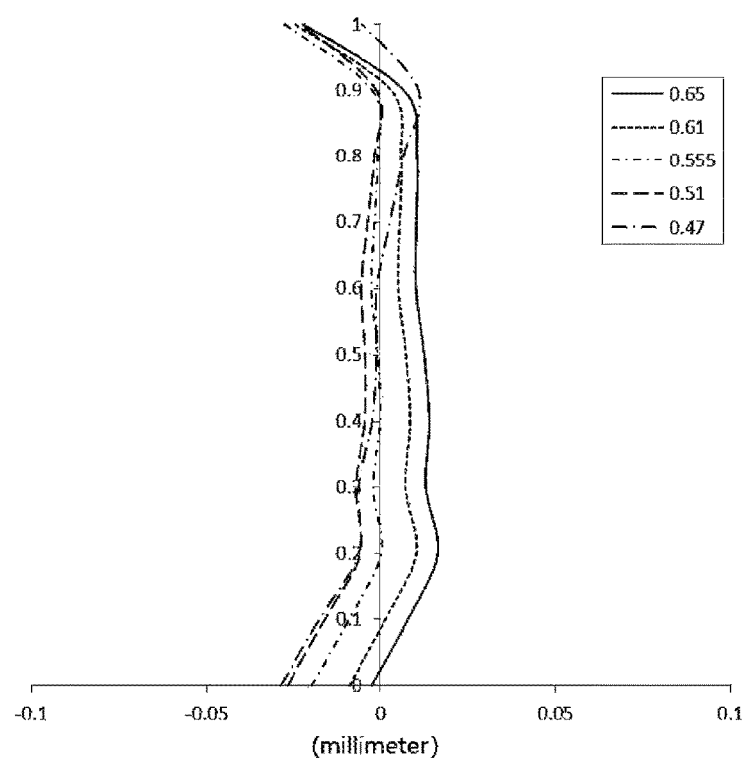
FIG. 6A to FIG. 6D show a longitudinal aberration curve, an astigmatism curve, a distortion curve and a lateral color curve of a camera lens group according to embodiment 3 respectively.
Figure 6B:
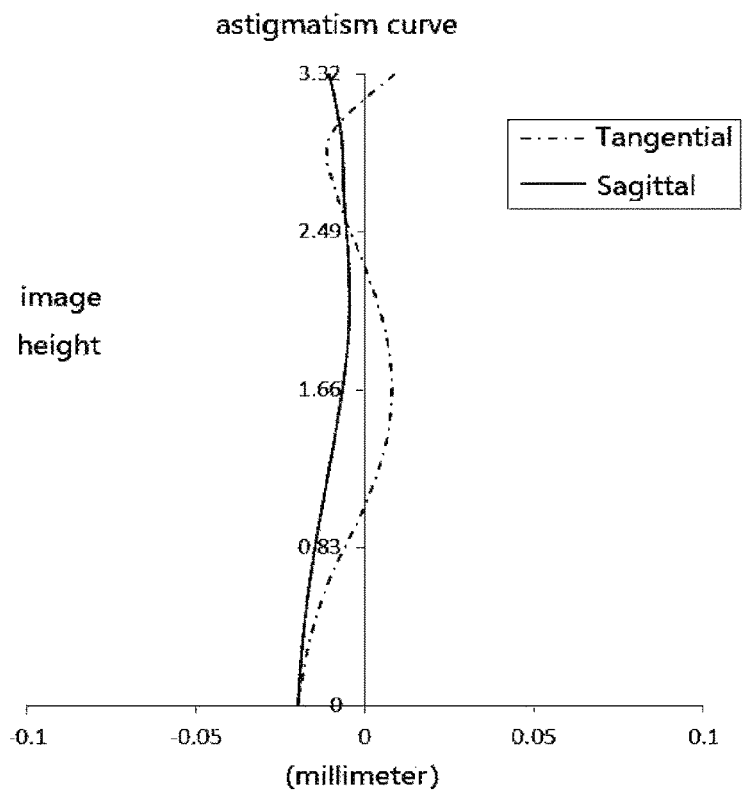
Figure 6C:
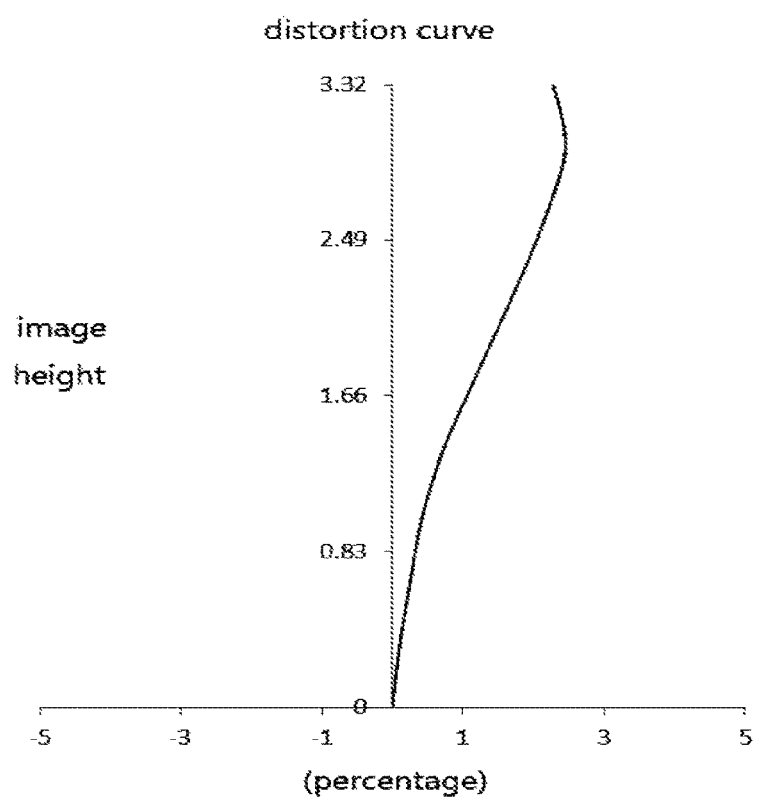
Figure 6D:
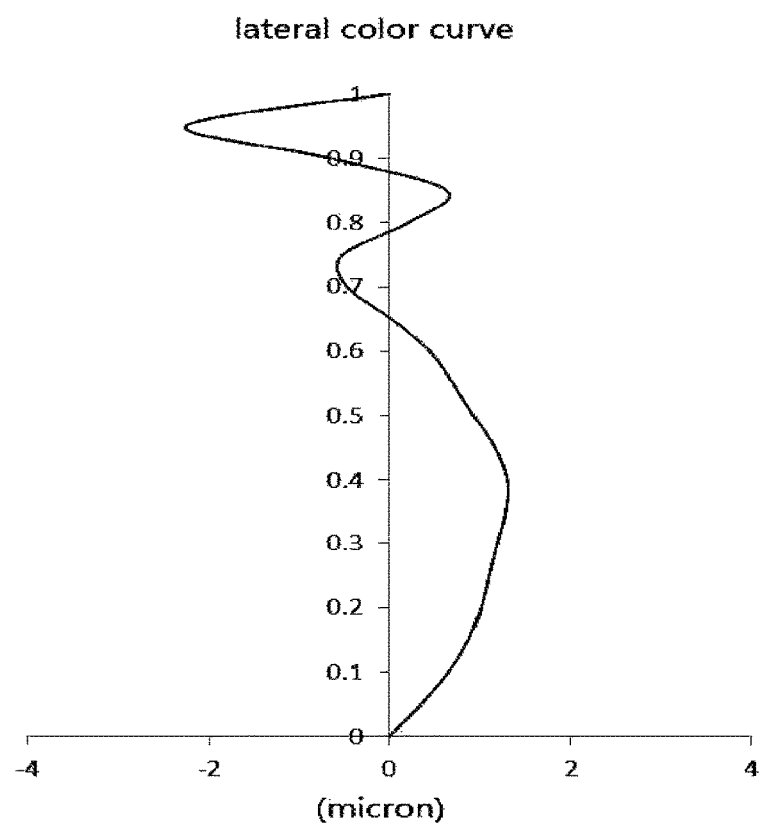

FIG. 6A shows a longitudinal aberration curve of the camera lens group according to embodiment 3 to represent deviation of a convergence focal point after light of different wavelengths passes through the lens. FIG. 6B shows an astigmatism curve of the camera lens group according to embodiment 3 to represent a tangential image surface curvature and a sagittal image surface curvature. FIG. 6C shows a distortion curve of the camera lens group according to embodiment 3 to represent distortion values corresponding to different image heights. FIG. 6D shows a lateral color curve of the camera lens group according to embodiment 3 to represent deviation of different image heights on the imaging surface after the light passes through the lens. According to FIG. 6A to FIG. 6D, it can be seen that high imaging quality of the camera lens group provided in embodiment 3 may be achieved.

Embodiment 4

Figure 7:
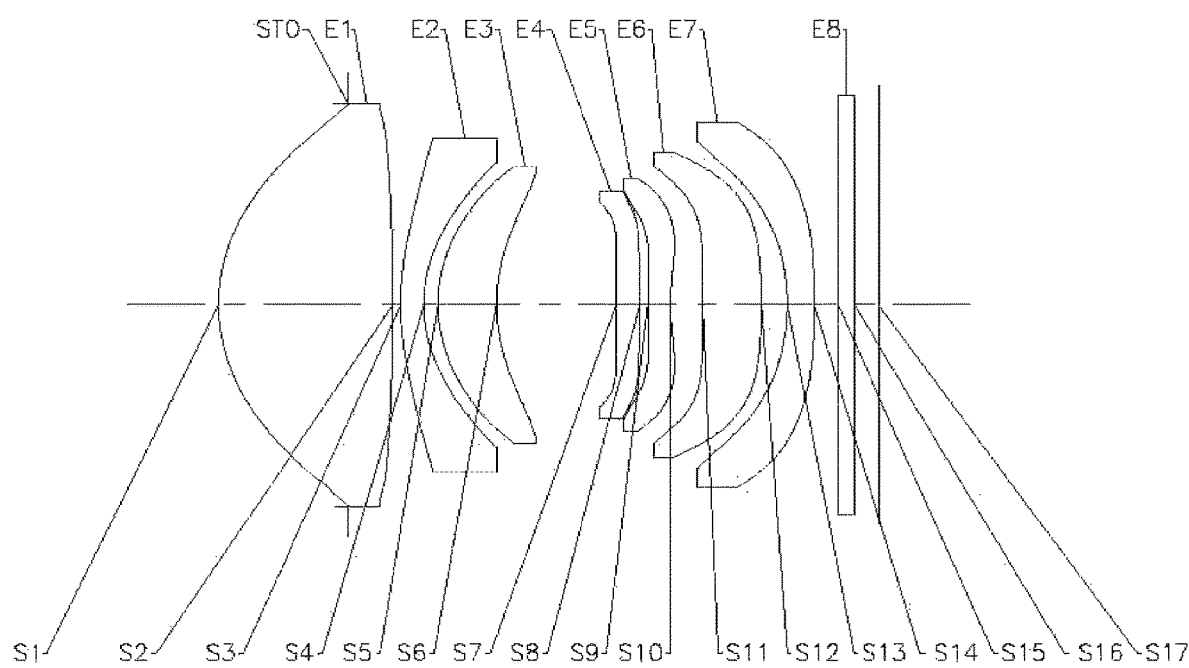
FIG. 7 is a structure diagram of a camera lens group according to embodiment 4 of the disclosure.

A camera lens group according to embodiment 4 of the disclosure will be described below with reference to FIG. 7 to FIG. 8D. FIG. 7 is a structure diagram of a camera lens group according to embodiment 4 of the disclosure.

As shown in FIG. 7, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a concave surface, while an image-side surface S12 is a convex surface. The seventh lens E7 has a negative refractive power, an object-side surface S13 thereof is a concave surface, while an image-side surface S14 is a convex surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the camera lens group is 7.86 mm, a TTL of the camera lens group is 8.40 mm, and a maximum field of view (FOV) of the camera lens group is 44.1°.

Table 7 is a basic parameter table of the camera lens group of embodiment 4, and units of the curvature radius, the thickness and the focal length therein are all millimeter (mm). Tables 8-1 and 8-2 show high-order coefficients applied to each aspheric mirror surface in embodiment 4. A surface type of each aspheric surface may be defined by formula (1) given in embodiment 1.

TABLE 7

| Surface number | Surface type | Curvature radius | Thickness/distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.6477 | | | | |
| S1 | Aspheric | 3.1750 | 2.2200 | 1.546 | 56.11 | 5.56 | −0.2823 |
| S2 | Aspheric | −51.7633 | 0.1000 | | | | 53.2285 |
| S3 | Aspheric | 5.7131 | 0.2950 | 1.678 | 19.25 | −8.07 | 1.0191 |
| S4 | Aspheric | 2.7363 | 0.1761 | | | | −0.2446 |
| S5 | Aspheric | 2.6517 | 0.7418 | 1.546 | 56.11 | 21.97 | −0.9527 |
| S6 | Aspheric | 3.0682 | 1.5284 | | | | −1.9290 |
| S7 | Aspheric | 39.8129 | 0.3000 | 1.666 | 20.40 | 23.17 | 99.0000 |
| S8 | Aspheric | −25.1508 | 0.1000 | | | | −96.1555 |
| S9 | Aspheric | 12.4255 | 0.2900 | 1.546 | 56.11 | −13.68 | −66.4546 |
| S10 | Aspheric | 4.6266 | 0.4071 | | | | −32.7322 |
| S11 | Aspheric | −169.7362 | 0.7468 | 1.678 | 19.25 | 12.44 | 99.0000 |
| S12 | Aspheric | −8.0438 | 0.3271 | | | | 9.6613 |
| S13 | Aspheric | −3.4229 | 0.3420 | 1.536 | 55.74 | −7.69 | 0.2718 |
| S14 | Aspheric | −20.7680 | 0.3036 | | | | −99.0000 |
| S15 | Spherical | Infinite | 0.2111 | 1.517 | 64.17 | | |
| S16 | Spherical | Infinite | 0.3076 | | | | |
| S17 | Spherical | Infinite | | | | | |

TABLE 8-1

| Surface number | A4 | A6 | A8 | A10 | A12 | A14 | A16 |
|---|---|---|---|---|---|---|---|
| S1 | −1.3369E−01 | −5.1874E−02 | −1.8445E−02 | −5.4975E−03 | −1.6515E−03 | −6.0165E−04 | −3.0153E−04 |
| S2 | −3.9024E−02 | −6.1967E−03 | −3.4366E−03 | −7.5471E−04 | −4.0776E−04 | −1.3620E−04 | 1.6606E−05 |
| S3 | −2.3566E−01 | 3.4047E−03 | 7.9427E−03 | −3.5318E−03 | 4.0796E−05 | −9.1985E−05 | 2.5775E−04 |
| S4 | −8.1749E−02 | −2.4055E−02 | 5.1301E−03 | −3.0943E−03 | −1.9774E−03 | −7.6147E−04 | 5.1825E−04 |
| S5 | 9.0989E−02 | 2.0138E−02 | 4.7123E−03 | −1.3750E−03 | −3.7495E−03 | −2.7810E−03 | −8.9005E−04 |
| S6 | −9.2266E−02 | −4.8809E−03 | −3.8602E−03 | −2.1443E−03 | −1.4964E−03 | −7.4908E−04 | −2.1865E−05 |
| S7 | −1.3794E−01 | −3.5747E−02 | −1.9782E−03 | −1.4777E−04 | 4.0437E−04 | −1.6681E−04 | 1.2806E−04 |
| S8 | −1.2988E−01 | −4.3789E−02 | 1.0828E−02 | 1.2948E−03 | 1.3406E−03 | −1.2127E−03 | 1.0987E−03 |
| S9 | −4.4240E−01 | −6.5256E−03 | −7.5033E−04 | −4.7620E−03 | 2.0712E−03 | −1.5169E−03 | 2.2567E−03 |
| S10 | −7.2002E−01 | −1.6195E−02 | 9.2729E−03 | −2.1257E−03 | 6.1157E−03 | −1.0977E−03 | 6.7044E−06 |
| S11 | −6.7264E−01 | −3.4351E−02 | 3.7300E−02 | 2.0930E−03 | 5.5117E−03 | −5.9046E−04 | 3.4665E−04 |
| S12 | −6.6556E−01 | −7.0709E−02 | 4.4058E−02 | 1.2348E−03 | 1.1949E−02 | 5.3676E−04 | 1.1798E−04 |
| S13 | 4.9218E−02 | 7.8963E−02 | 7.2703E−02 | 7.0567E−03 | 4.7190E−03 | −9.2450E−03 | −3.2585E−03 |
| S14 | −1.0237E+00 | 4.3277E−03 | −1.3524E−02 | 2.7306E−02 | 1.1062E−02 | 3.1352E−03 | −3.1119E−04 |

TABLE 8-2

| Surface number | A18 | A20 | A22 | A24 | A26 | A28 |
|---|---|---|---|---|---|---|
| S1 | −1.4027E−04 | −5.3720E−05 | −1.7104E−05 | −2.8609E−06 | 2.9299E−06 | 0.0000E+00 |
| S2 | −2.4051E−05 | 1.5091E−05 | −4.3023E−06 | −1.4882E−06 | 1.1023E−06 | 0.0000E+00 |
| S3 | −1.3134E−05 | 1.0768E−05 | 1.6201E−05 | −1.4549E−05 | 2.7695E−06 | 0.0000E+00 |
| S4 | 3.4599E−04 | 6.7937E−05 | 2.3985E−05 | −2.4346E−05 | −2.0529E−05 | 0.0000E+00 |
| S5 | −1.1603E−04 | −5.7459E−06 | 5.0581E−05 | 2.5220E−05 | 1.1912E−06 | 0.0000E+00 |
| S6 | 1.4133E−04 | 8.0407E−05 | 1.2383E−05 | −8.0637E−06 | −1.5847E−05 | 0.0000E+00 |
| S7 | −6.8283E−05 | 4.2850E−05 | −2.4047E−05 | 1.4846E−05 | −5.0076E−06 | 0.0000E+00 |
| S8 | −1.1836E−04 | 3.3811E−04 | −1.0528E−04 | 6.3527E−05 | −5.4802E−05 | 0.0000E+00 |
| S9 | 2.6987E−04 | 6.8711E−04 | 5.9058E−05 | 1.6266E−04 | −4.7431E−06 | −3.6475E−06 |
| S10 | −2.2543E−03 | −4.7452E−04 | −3.9051E−04 | 1.6876E−05 | −5.5241E−05 | 4.3443E−05 |
| S11 | 1.8211E−04 | 9.7039E−04 | 4.7091E−04 | −2.2515E−05 | −1.5339E−04 | −1.8343E−05 |
| S12 | −2.9907E−03 | −1.9354E−03 | −8.5024E−04 | −4.1418E−04 | −2.8523E−04 | −5.3178E−05 |
| S13 | −4.1911E−03 | 2.1621E−03 | 2.0383E−03 | −1.4525E−04 | −6.4703E−04 | −1.4635E−04 |
| S14 | −6.0422E−03 | −3.2784E−03 | −2.3197E−03 | −1.6210E−03 | −9.6125E−04 | −4.0032E−04 |

Figure 8A:
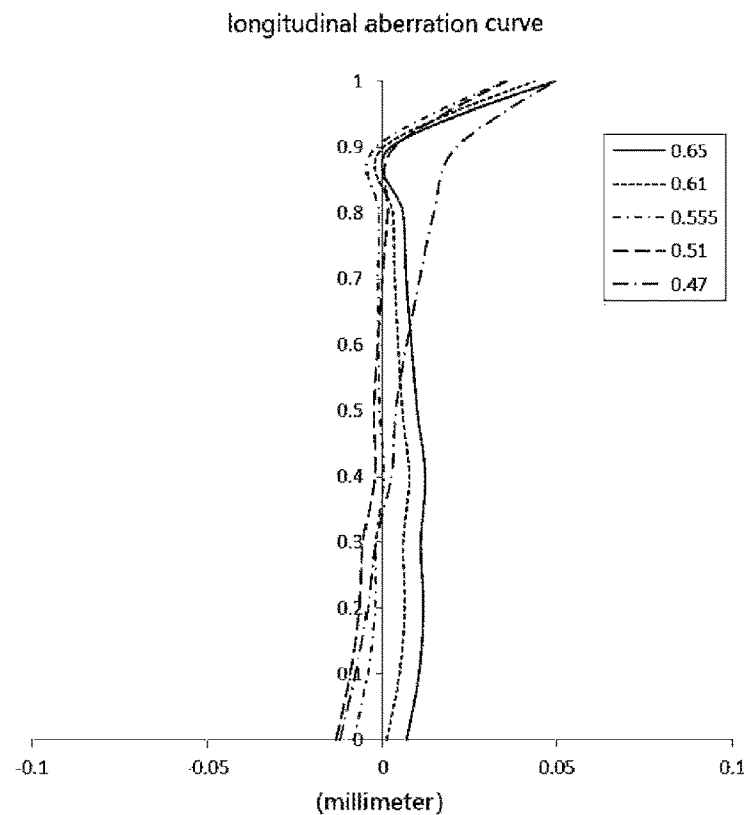
FIG. 8A to FIG. 8D show a longitudinal aberration curve, an astigmatism curve, a distortion curve and a lateral color curve of a camera lens group according to embodiment 4 respectively.
Figure 8B:
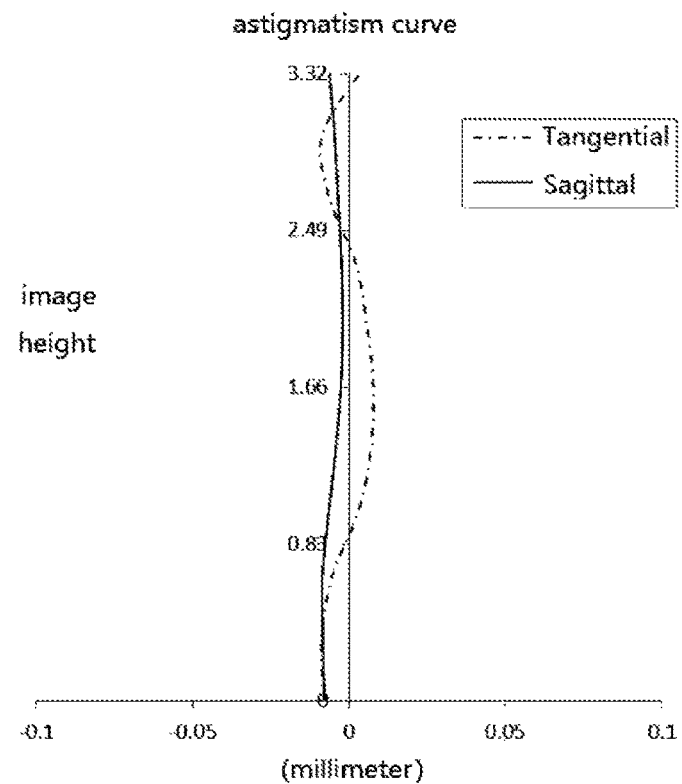
Figure 8C:
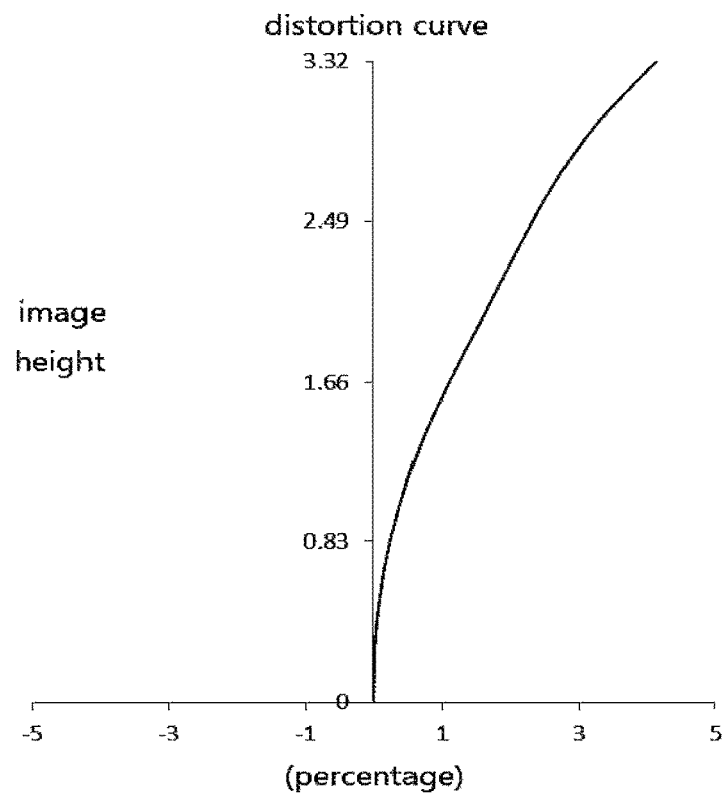
Figure 8D:
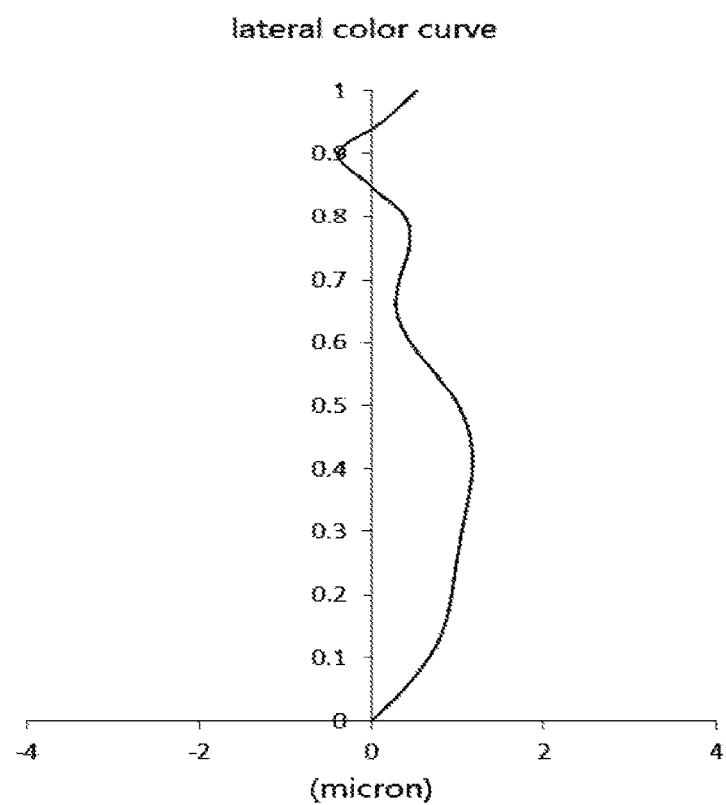

FIG. 8A shows a longitudinal aberration curve of the camera lens group according to embodiment 4 to represent deviation of a convergence focal point after light of different wavelengths passes through the lens. FIG. 8B shows an astigmatism curve of the camera lens group according to embodiment 4 to represent a tangential image surface curvature and a sagittal image surface curvature. FIG. 8C shows a distortion curve of the camera lens group according to embodiment 4 to represent distortion values corresponding to different image heights. FIG. 8D shows a lateral color curve of the camera lens group according to embodiment 4 to represent deviation of different image heights on the imaging surface after the light passes through the lens. According to FIG. 8A to FIG. 8D, it can be seen that high imaging quality of the camera lens group provided in embodiment 4 may be achieved.

Embodiment 5

Figure 9:
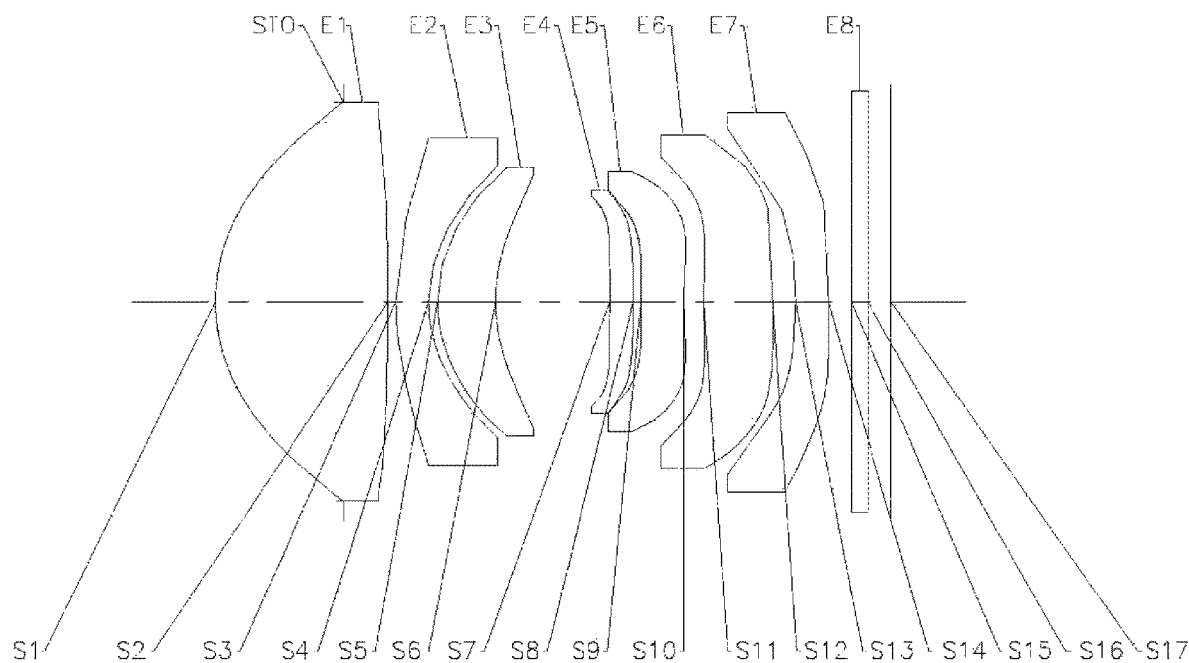
FIG. 9 is a structure diagram of a camera lens group according to embodiment 5 of the disclosure.

A camera lens group according to embodiment 5 of the disclosure will be described below with reference to FIG. 9 to FIG. 10D. FIG. 9 is a structure diagram of a camera lens group according to embodiment 5 of the disclosure.

As shown in FIG. 9, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a concave surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a concave surface, while an image-side surface S14 is a convex surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the camera lens group is 7.90 mm, a TTL of the camera lens group is 8.68 mm, and a maximum field of view (FOV) of the camera lens group is 44.0°.

Table 9 is a basic parameter table of the camera lens group of embodiment 5, and units of the curvature radius, the thickness and the focal length therein are all millimeter (mm). Tables 10-1 and 10-2 show high-order coefficients applied to each aspheric mirror surface in embodiment 5. A surface type of each aspheric surface may be defined by formula (1) given in embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.6477 | | | | |
| S1 | Aspheric | 3.2258 | 2.2200 | 1.546 | 56.11 | 5.67 | −0.2661 |
| S2 | Aspheric | −57.6828 | 0.1002 | | | | −1.5489 |
| S3 | Aspheric | 5.6300 | 0.4200 | 1.678 | 19.25 | −7.82 | 1.1465 |
| S4 | Aspheric | 2.6465 | 0.1159 | | | | −0.2248 |
| S5 | Aspheric | 2.7048 | 0.7418 | 1.546 | 56.11 | 21.98 | −0.8666 |
| S6 | Aspheric | 3.1537 | 1.4723 | | | | −1.6865 |
| S7 | Aspheric | 25937.8985 | 0.3000 | 1.666 | 20.40 | 24.11 | 99.0000 |
| S8 | Aspheric | −16.0798 | 0.1000 | | | | 67.4450 |
| S9 | Aspheric | −100.0000 | 0.5498 | 1.546 | 56.11 | −15.51 | −99.0000 |
| S10 | Aspheric | 9.2678 | 0.2538 | | | | −31.0306 |
| S11 | Aspheric | 20.8113 | 0.8838 | 1.678 | 19.25 | 18.11 | −99.0000 |
| S12 | Aspheric | −29.3717 | 0.2932 | | | | 36.5499 |
| S13 | Aspheric | −4.8803 | 0.4200 | 1.536 | 55.74 | −11.02 | 0.7036 |
| S14 | Aspheric | −28.7467 | 0.2969 | | | | −99.0000 |
| S15 | Spherical | Infinite | 0.2111 | 1.517 | 64.17 | | |
| S16 | Spherical | Infinite | 0.3009 | | | | |
| S17 | Spherical | Infinite | | | | | |

TABLE 10-1

| Surface number | A4 | A6 | A8 | A10 | A12 | A14 | A16 |
|---|---|---|---|---|---|---|---|
| S1 | −1.1411E−01 | −4.7127E−02 | −1.5737E−02 | −4.6255E−03 | −1.3936E−03 | −5.3119E−04 | −2.5268E−04 |
| S2 | −3.4836E−02 | −5.3489E−03 | −2.2575E−03 | −1.8863E−03 | 5.2614E−04 | −7.3894E−04 | 3.3455E−04 |
| S3 | −2.3154E−01 | 1.0624E−02 | 3.2761E−03 | −4.0433E−03 | 9.4721E−04 | −8.0568E−04 | 3.6525E−04 |
| S4 | −7.7584E−02 | −1.7449E−02 | −2.6790E−03 | −6.5559E−03 | −1.3196E−03 | −9.2286E−04 | 5.5178E−04 |
| S5 | 1.0189E−01 | 1.6860E−02 | 6.1702E−03 | −1.7241E−03 | −8.1435E−04 | −1.2506E−03 | −6.5463E−05 |
| S6 | −8.2697E−02 | −1.3293E−02 | −3.8236E−03 | −7.5703E−04 | −8.2673E−04 | −7.3431E−04 | −3.7161E−04 |
| S7 | −1.2456E−01 | −3.1048E−02 | −2.0421E−03 | −8.2878E−04 | 3.8293E−04 | −6.2234E−05 | 8.9083E−05 |
| S8 | −1.6974E−01 | −3.8047E−02 | 1.4323E−02 | −2.5975E−04 | 2.9709E−03 | −6.5397E−04 | 5.3874E−04 |
| S9 | −4.3913E−01 | −3.6211E−02 | 1.2463E−02 | −5.0710E−03 | 2.5202E−03 | −7.8838E−04 | 1.1814E−03 |
| S10 | −7.6469E−01 | −4.8938E−02 | 5.5264E−03 | −9.3846E−03 | 7.3560E−04 | −1.4093E−03 | 9.4687E−04 |
| S11 | −6.6708E−01 | −1.2200E−02 | 3.1435E−02 | −7.9925E−04 | 2.6380E−03 | −1.5700E−03 | 7.5116E−04 |
| S12 | −6.7599E−01 | −6.8670E−02 | 3.2433E−02 | −1.6506E−02 | 6.5890E−03 | −3.1960E−03 | 2.9842E−03 |
| S13 | −6.9859E−02 | 2.7894E−02 | 5.9577E−02 | −4.8288E−02 | 2.6065E−02 | −6.7538E−03 | 5.4887E−03 |
| S14 | −5.8087E−01 | 9.0079E−02 | 3.3722E−02 | −1.5404E−02 | 3.5548E−02 | −4.3596E−03 | 6.7051E−03 |

TABLE 10-2

| Surface number | A18 | A20 | A22 | A24 | A26 | A28 |
|---|---|---|---|---|---|---|
| S1 | −1.3359E−04 | −5.7569E−05 | −2.7880E−05 | −5.2075E−06 | −3.9898E−06 | 0.0000E+00 |
| S2 | −2.1157E−04 | 9.3945E−05 | −3.9641E−05 | 1.4228E−05 | 2.5623E−06 | 0.0000E+00 |
| S3 | −9.7298E−05 | 3.3701E−05 | 3.0189E−06 | −1.2395E−05 | 1.2198E−06 | 0.0000E+00 |
| S4 | 2.6334E−04 | −6.2348E−05 | −1.2137E−04 | −1.0497E−04 | −4.2599E−05 | 0.0000E+00 |
| S5 | 2.0900E−04 | 1.0488E−04 | 2.6609E−05 | −1.5809E−05 | −2.1608E−05 | 0.0000E+00 |
| S6 | −1.9688E−04 | −1.3104E−04 | −9.1790E−05 | −4.6007E−05 | −1.7865E−05 | 0.0000E+00 |
| S7 | −3.4322E−05 | 1.3842E−05 | −2.5943E−06 | 1.4746E−06 | −2.9639E−06 | 7.4434E−07 |
| S8 | −2.7866E−04 | 1.1516E−04 | −4.9077E−05 | −5.1611E−07 | −4.4039E−06 | 3.2450E−06 |
| S9 | −7.8619E−05 | 2.9848E−05 | 1.1346E−05 | 2.4904E−05 | 9.7301E−06 | 4.7703E−06 |
| S10 | −6.1033E−04 | 1.9534E−04 | −8.1438E−05 | 9.5970E−06 | −1.2959E−06 | −6.9256E−06 |
| S11 | −8.3501E−04 | 4.8086E−04 | 1.6146E−05 | 7.0277E−07 | 3.1928E−06 | −1.8343E−05 |
| S12 | −2.4721E−03 | 8.4450E−04 | 2.5671E−04 | 1.0686E−04 | 3.3388E−05 | −5.3178E−05 |
| S13 | −4.7935E−03 | 3.2839E−03 | −1.1587E−03 | −1.2075E−03 | −2.8585E−04 | −1.4635E−04 |
| S14 | −4.7749E−03 | 4.1048E−04 | −4.1769E−03 | −1.4669E−03 | −1.0062E−03 | −4.0032E−04 |

Figure 10A:
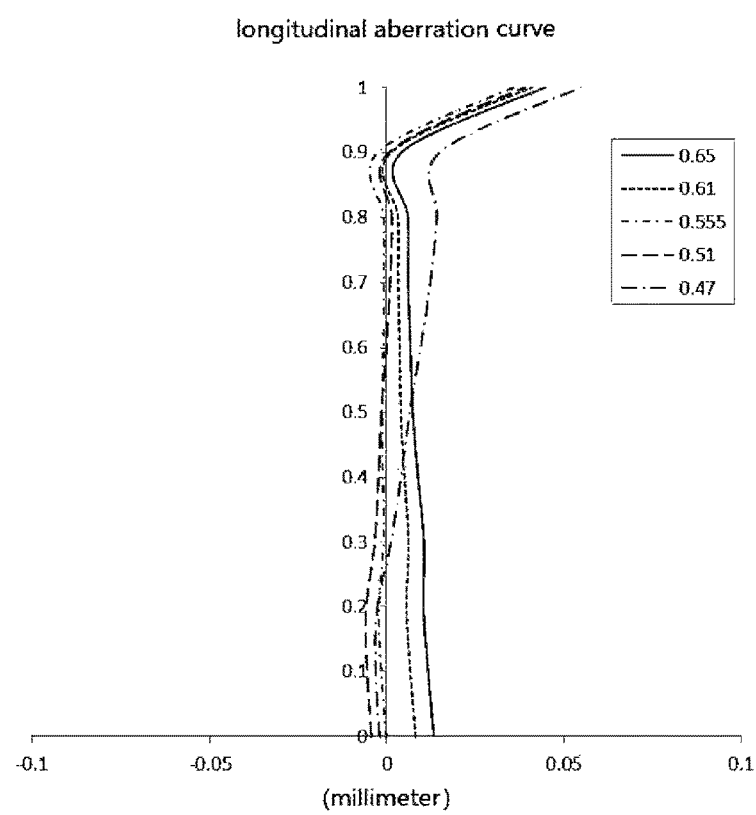
FIG. 10A to FIG. 10D show a longitudinal aberration curve, an astigmatism curve, a distortion curve and a lateral color curve of a camera lens group according to embodiment 5 respectively.
Figure 10B:
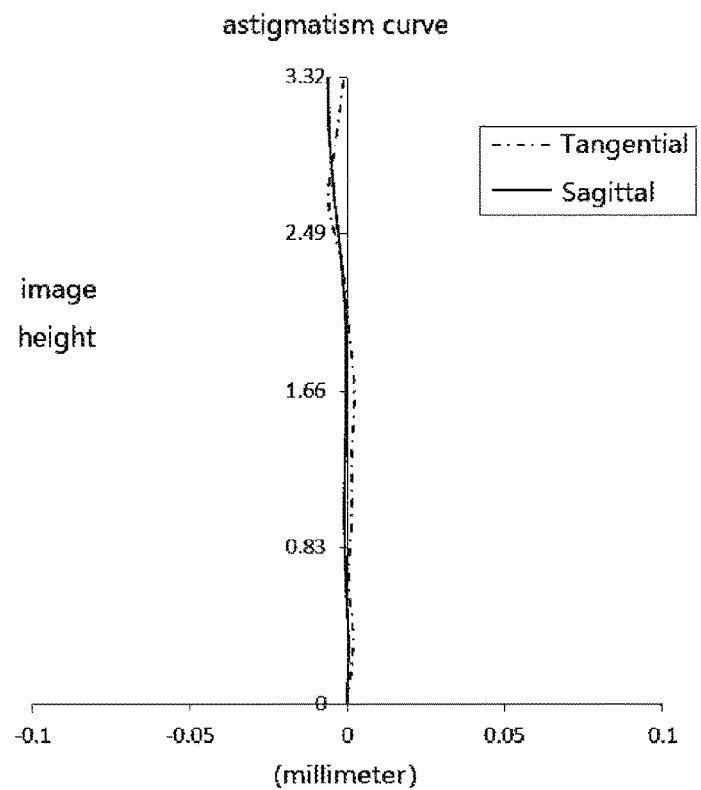
Figure 10C:
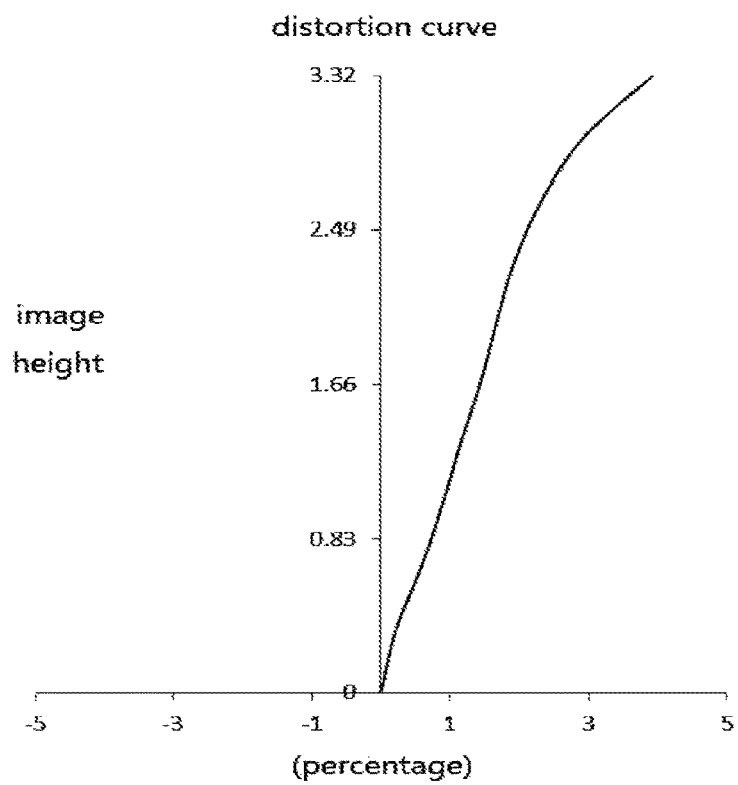
Figure 10D:
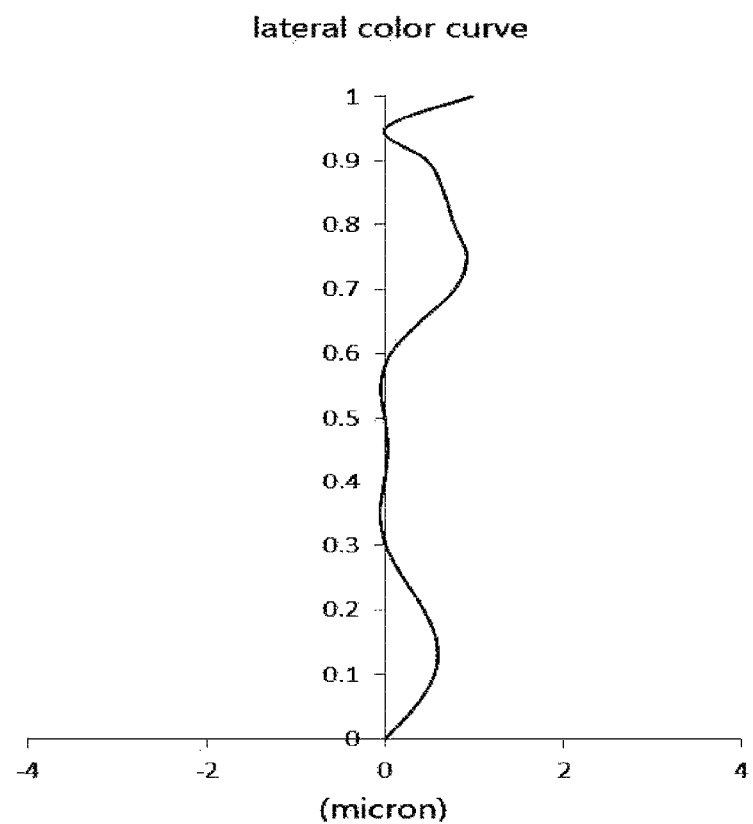

FIG. 10A shows a longitudinal aberration curve of the camera lens group according to embodiment 5 to represent deviation of a convergence focal point after light of different wavelengths passes through the lens. FIG. 10B shows an astigmatism curve of the camera lens group according to embodiment 5 to represent a tangential image surface curvature and a sagittal image surface curvature. FIG. 10C shows a distortion curve of the camera lens group according to embodiment 5 to represent distortion values corresponding to different image heights. FIG. 10D shows a lateral color curve of the camera lens group according to embodiment 5 to represent deviation of different image heights on the imaging surface after the light passes through the lens. According to FIG. 10A to FIG. 10D, it can be seen that high imaging quality of the camera lens group provided in embodiment 5 may be achieved.

Embodiment 6

Figure 11:
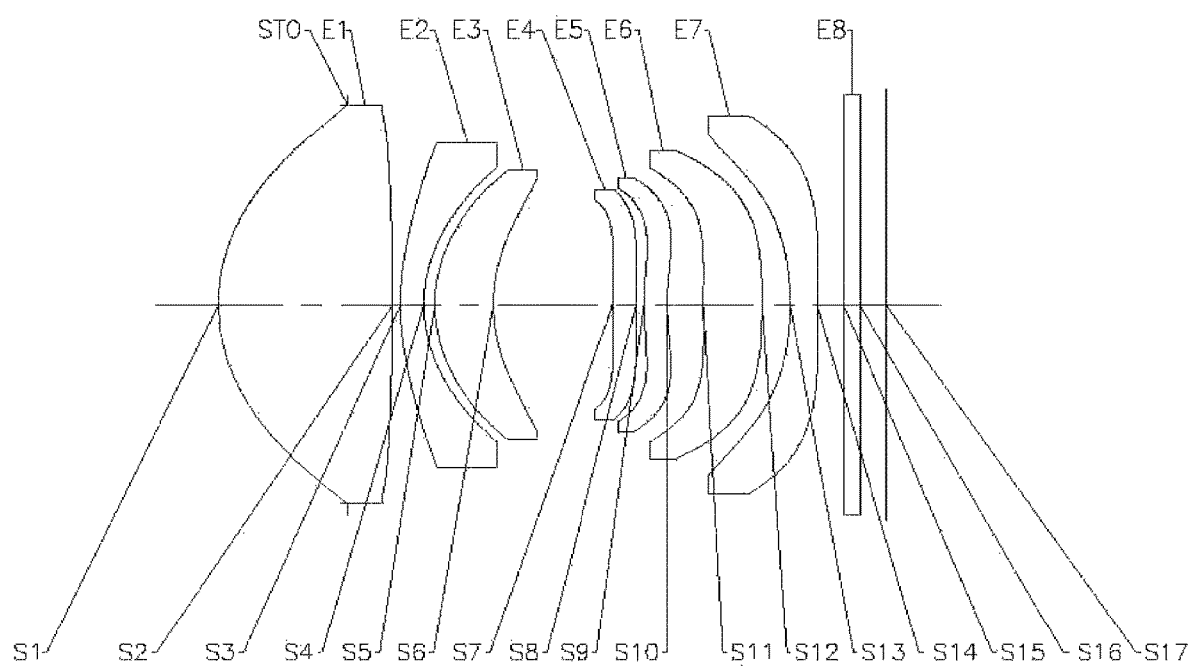
FIG. 11 is a structure diagram of a camera lens group according to embodiment 6 of the disclosure.

A camera lens group according to embodiment 6 of the disclosure will be described below with reference to FIG. 11 to FIG. 12D. FIG. 11 is a structure diagram of a camera lens group according to embodiment 6 of the disclosure.

As shown in FIG. 11, the camera lens group sequentially includes, from an object side to an image side, a diaphragm STO, a first lens E1, a second lens E2, a third lens E3, a fourth lens E4, a fifth lens E5, a sixth lens E6, a seventh lens E7, an optical filter E8 and an imaging surface S17.

The first lens E1 has a positive refractive power, an object-side surface S1 thereof is a convex surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a convex surface. The seventh lens E7 has a negative refractive power, an object-side surface S13 thereof is a concave surface, while an image-side surface S14 is a concave surface. The optical filter E8 has an object-side surface S15 and an image-side surface S16. Light from an object sequentially penetrates through each of the surfaces S1 to S16 and is finally imaged on the imaging surface S17.

In the example, a total effective focal length f of the camera lens group is 7.85 mm, a TTL of the camera lens group is 8.51 mm, and a maximum field of view (FOV) of the camera lens group is 44.7°.

Table 11 is a basic parameter table of the camera lens group of embodiment 6, and units of the curvature radius, the thickness and the focal length therein are all millimeter (mm). Tables 12-1 and 12-2 show high-order coefficients applied to each aspheric mirror surface in embodiment 6. A surface type of each aspheric surface may be defined by formula (1) given in embodiment 1.

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −1.6477 | | | | |
| S1 | Aspheric | 3.2157 | 2.2200 | 1.546 | 56.11 | 5.67 | −0.2696 |
| S2 | Aspheric | −62.8114 | 0.1000 | | | | 8.1468 |
| S3 | Aspheric | 5.3322 | 0.2950 | 1.678 | 19.25 | −8.05 | 1.1185 |
| S4 | Aspheric | 2.6367 | 0.1423 | | | | −0.2029 |
| S5 | Aspheric | 2.5611 | 0.7418 | 1.546 | 56.11 | 25.52 | −0.9632 |
| S6 | Aspheric | 2.8170 | 1.5207 | | | | −1.5984 |
| S7 | Aspheric | 84.9786 | 0.3000 | 1.666 | 20.40 | 93.06 | −54.4494 |
| S8 | Aspheric | −229.2363 | 0.1000 | | | | 99.0000 |
| S9 | Aspheric | 5.0271 | 0.2900 | 1.546 | 56.11 | −44.20 | −27.8098 |
| S10 | Aspheric | 4.0755 | 0.4645 | | | | −29.7095 |
| S11 | Aspheric | 47.4288 | 0.7468 | 1.678 | 19.25 | 10.95 | −99.0000 |
| S12 | Aspheric | −8.7354 | 0.3547 | | | | 9.0096 |
| S13 | Aspheric | −4.1256 | 0.3420 | 1.536 | 55.74 | −7.37 | 0.4870 |
| S14 | Aspheric | 98.0000 | 0.3371 | | | | 29.4052 |
| S15 | Spherical | Infinite | 0.2111 | 1.517 | 64.17 | | |
| S16 | Spherical | Infinite | 0.3411 | | | | |
| S17 | Spherical | Infinite | | | | | |

TABLE 12-1

| Surface number | A4 | A6 | A8 | A10 | A12 | A14 | A16 |
|---|---|---|---|---|---|---|---|
| S1 | −1.1698E−01 | −4.9001E−02 | −1.7134E−02 | −5.2413E−03 | −1.6157E−03 | −5.8333E−04 | −2.4760E−04 |
| S2 | −3.7826E−02 | −5.7782E−03 | −3.6238E−03 | −1.3496E−03 | 2.4017E−04 | −5.5901E−04 | 2.6577E−04 |
| S3 | −2.3164E−01 | 8.6306E−03 | 5.4754E−03 | −4.2893E−03 | 1.2600E−03 | −8.3217E−04 | 4.2269E−04 |
| S4 | −7.1230E−02 | −1.4970E−02 | 7.8905E−04 | −5.3116E−03 | −1.3943E−04 | −5.3352E−04 | 4.9585E−04 |
| S5 | 9.0123E−02 | 1.9770E−02 | 2.3851E−03 | −1.8630E−03 | −1.5277E−03 | −1.3544E−03 | −3.6809E−04 |
| S6 | −7.5016E−02 | −1.1928E−02 | −7.7978E−03 | −2.9869E−03 | −1.4350E−03 | −7.4518E−04 | −3.2033E−04 |
| S7 | −1.1523E−01 | −3.2848E−02 | −1.0033E−03 | −8.7759E−04 | 1.7679E−04 | −1.5247E−04 | 5.3656E−05 |
| S8 | −1.7511E−01 | −4.0548E−02 | 6.6347E−03 | −1.5558E−03 | −4.5544E−05 | −1.0324E−03 | 3.6412E−04 |
| S9 | −4.3219E−01 | −9.6115E−03 | 2.9546E−03 | −2.9831E−03 | −1.6904E−03 | −1.8931E−03 | 6.2302E−04 |
| S10 | −7.5833E−01 | −2.8157E−02 | −8.2163E−03 | −1.3474E−03 | 3.3979E−03 | 3.0564E−04 | 3.1239E−03 |
| S11 | −8.4936E−01 | −3.4734E−02 | 1.1680E−02 | 4.6533E−03 | 2.5497E−03 | −2.3229E−04 | 7.9394E−04 |
| S12 | −7.6615E−01 | −5.1482E−02 | 3.1895E−02 | 7.2179E−03 | 1.5871E−02 | 6.8945E−03 | 5.0545E−03 |
| S13 | −6.0450E−02 | 4.2636E−02 | 5.4999E−02 | −1.2121E−02 | 1.5395E−02 | −2.6209E−03 | 3.5567E−04 |
| S14 | −1.0779E+00 | −4.4906E−02 | −2.1812E−03 | −7.2690E−03 | 7.2727E−03 | −8.1717E−03 | −5.0465E−03 |

TABLE 12-2

| Surface number | A18 | A20 | A22 | A24 | A26 | A28 |
|---|---|---|---|---|---|---|
| S1 | −1.2386E−04 | −5.5980E−05 | −2.8643E−05 | −6.1958E−06 | −4.1347E−06 | 0.0000E+00 |
| S2 | −1.8304E−04 | 1.0229E−04 | −4.2560E−05 | 1.4600E−05 | −3.7172E−06 | 0.0000E+00 |
| S3 | −1.2535E−04 | 6.9269E−05 | −1.3569E−05 | −2.0530E−05 | 7.8504E−06 | 0.0000E+00 |
| S4 | 1.7226E−04 | −6.5151E−05 | −1.8704E−04 | −1.8468E−04 | −6.2940E−05 | 0.0000E+00 |
| S5 | 4.5932E−05 | 1.0933E−04 | 3.7402E−05 | −3.7972E−05 | −3.1357E−05 | 0.0000E+00 |
| S6 | −1.5596E−04 | −1.1519E−04 | −9.6871E−05 | −5.5799E−05 | −1.9624E−05 | 0.0000E+00 |
| S7 | −2.8341E−05 | 1.1601E−05 | −5.2890E−06 | 3.4859E−06 | −9.4207E−07 | 0.0000E+00 |
| S8 | −1.8096E−04 | 8.3502E−05 | −4.2243E−05 | 1.5136E−05 | −5.1559E−06 | 0.0000E+00 |
| S9 | −2.7773E−04 | 4.7171E−05 | −8.2244E−05 | 1.1768E−05 | −3.8402E−06 | −3.6475E−06 |
| S10 | 9.4307E−04 | 1.1928E−03 | 6.4013E−04 | 3.7006E−04 | 1.0758E−04 | 4.3443E−05 |
| S11 | 4.1904E−04 | 6.5971E−04 | 2.7506E−04 | −7.3288E−05 | −9.8906E−05 | −1.8343E−05 |
| S12 | 6.6053E−04 | −2.1385E−04 | −5.2340E−04 | −4.4637E−04 | −1.6762E−04 | −5.3178E−05 |
| S13 | −3.7860E−03 | 3.1551E−04 | 6.1020E−04 | 4.1714E−04 | 3.3487E−05 | −1.4635E−04 |
| S14 | −9.4966E−03 | −4.8483E−03 | −3.5946E−03 | −1.6408E−03 | −9.6746E−04 | −4.0032E−04 |

Figure 12A:
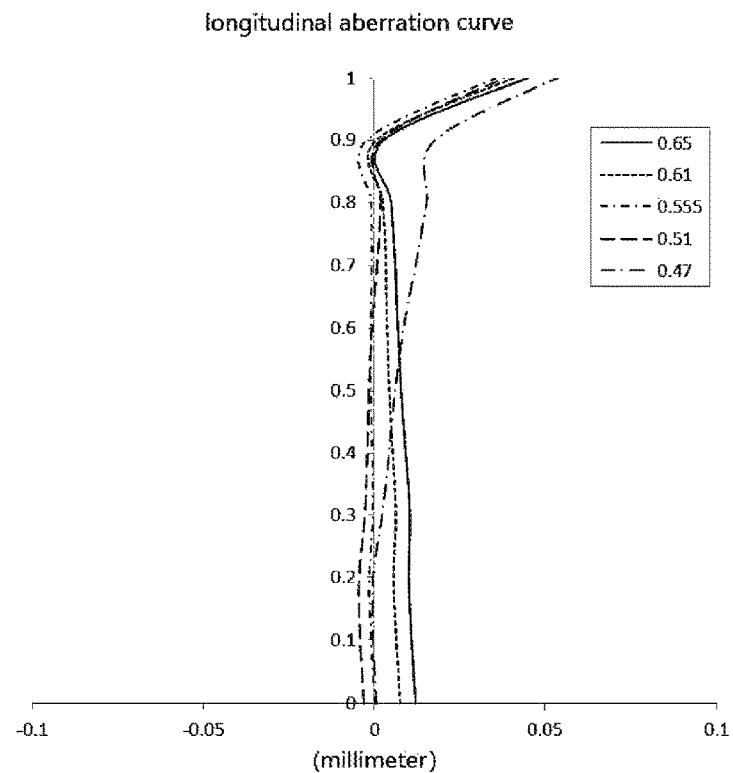
FIG. 12A to FIG. 12D show a longitudinal aberration curve, an astigmatism curve, a distortion curve and a lateral color curve of a camera lens group according to embodiment 6 respectively.
Figure 12B:
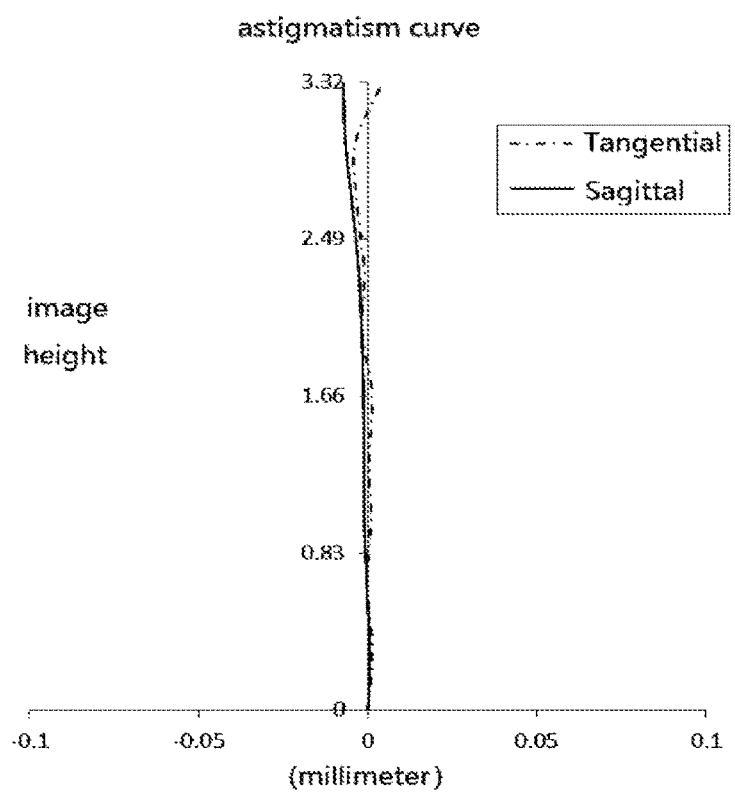
Figure 12C:
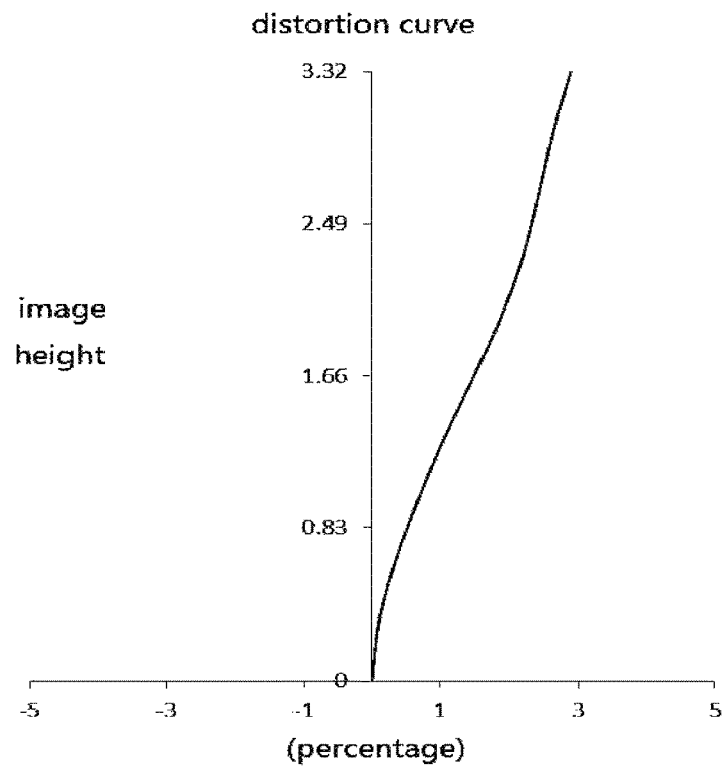
Figure 12D:
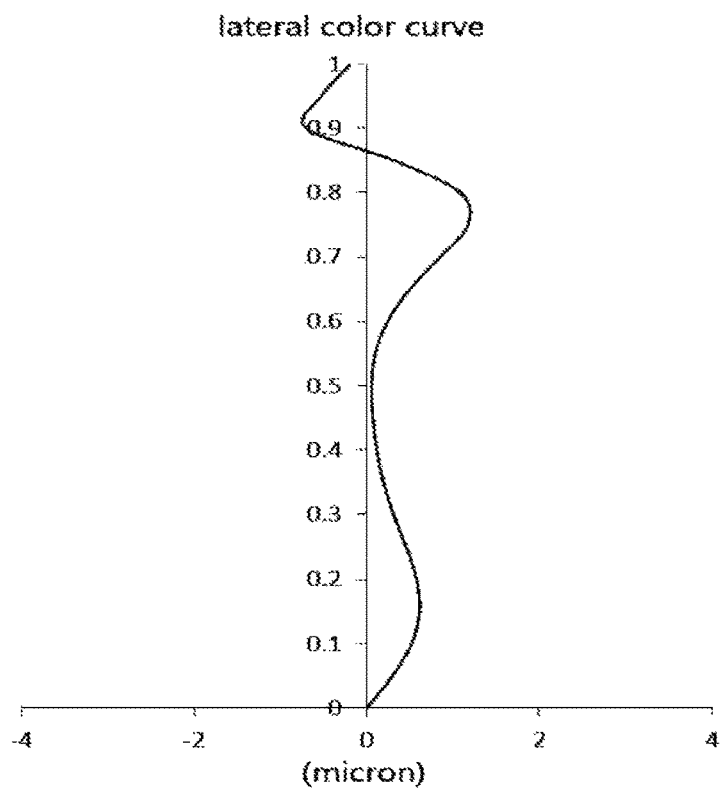

FIG. 12A shows a longitudinal aberration curve of the camera lens group according to embodiment 6 to represent deviation of a convergence focal point after light of different wavelengths passes through the lens. FIG. 12B shows an astigmatism curve of the camera lens group according to embodiment 6 to represent a tangential image surface curvature and a sagittal image surface curvature. FIG. 12C shows a distortion curve of the camera lens group according to embodiment 6 to represent distortion values corresponding to different image heights. FIG. 12D shows a lateral color curve of the camera lens group according to embodiment 6 to represent deviation of different image heights on the imaging surface after the light passes through the lens. According to FIG. 12A to FIG. 12D, it can be seen that high imaging quality of the camera lens group provided in embodiment 6 may be achieved.

From the above, embodiment 1 to embodiment 6 meet a relationship shown in Table 13 respectively.

TABLE 13

| Conditional expression/ embodiment | 1 | 2 | 3 | 4 | 5 | 6 |
|---|---|---|---|---|---|---|
| f/EPD | 1.30 | 1.29 | 1.29 | 1.27 | 1.29 | 1.28 |
| f1/T34 | 3.55 | 3.53 | 4.11 | 3.64 | 3.85 | 3.73 |
| EPD/CT1 | 2.70 | 2.73 | 2.82 | 2.79 | 2.76 | 2.76 |
| f/f1 | 1.41 | 1.42 | 1.34 | 1.41 | 1.39 | 1.38 |
| f/f45 | −0.44 | −0.38 | −0.32 | −0.23 | −0.18 | −0.09 |
| f23/f1 | −2.47 | −2.36 | −2.55 | −2.33 | −2.16 | −2.09 |
| f2/f7 | 1.11 | 1.05 | 1.02 | 1.05 | 0.71 | 1.09 |
| f/f6-f/f3 | 0.41 | 0.41 | 0.24 | 0.27 | 0.08 | 0.41 |
| CT7/T67 | 1.22 | 1.22 | 1.60 | 1.05 | 1.43 | 0.96 |
| T56/(T23 + T45) | 3.99 | 3.99 | 1.54 | 1.47 | 1.18 | 1.92 |
| CT1/ΣAT | 0.89 | 0.89 | 0.94 | 0.84 | 0.95 | 0.83 |
| f/R13 | −2.21 | −2.29 | −2.16 | −2.30 | −1.62 | −1.90 |
| R12/R10 | −3.70 | −3.23 | −2.11 | −1.74 | −3.17 | −2.14 |
| f/(R3-R4) | 2.72 | 2.70 | 3.12 | 2.64 | 2.65 | 2.91 |
| f/R5-f/R6 | 0.42 | 0.37 | 0.44 | 0.40 | 0.42 | 0.28 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned camera lens group.

The above description is only description about the preferred embodiments of the disclosure and adopted technical principles. It is understood by those skilled in the art that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A camera lens group, sequentially comprising, from an object side to an image side along an optical axis:

a first lens group with a positive refractive power, sequentially comprising, along the optical axis, a first lens, a second lens and a third lens with refractive power respectively; and a second lens group with a negative refractive power, sequentially comprising, along the optical axis, a fourth lens, a fifth lens, a sixth lens and a seventh lens with refractive power respectively, wherein a total effective focal length f of the camera lens group and an entrance pupil diameter (EPD) of the camera lens group meet f/EPD<1.4; and an effective focal length f1 of the first lens and a spacing distance T34 of the third lens and the fourth lens on the optical axis meet 3.0<f1/T34<5.0;

a combined focal length f23 of the second lens and the third lens and the effective focal length f1 of the first lens meet −3.0<f23/f1≤−2.0.

2. The camera lens group according to claim 1, wherein the EPD of the camera lens group and a center thickness CT1 of the first lens on the optical axis meet 2.5<EPD/CT1<3.0.

3. The camera lens group according to claim 1, wherein the total effective focal length f of the camera lens group meets 7.0 mm<f<8.0 mm.

4. The camera lens group according to claim 1, wherein the total effective focal length f of the camera lens group and the effective focal length f1 of the first lens meet 1.2<f/f1<1.5.

5. The camera lens group according to claim 1, wherein the total effective focal length f of the camera lens group and a combined focal length f45 of the fourth lens and the fifth lens meet −0.5<f/f45<0.

6. The camera lens group according to claim 1, wherein an effective focal length f2 of the second lens and an effective focal length f7 of the seventh lens meet 0.5<f2/f7<1.2.

7. The camera lens group according to claim 1, wherein the total effective focal length f of the camera lens group, an effective focal length f3 of the third lens and an effective focal length f6 of the sixth lens meet 0.2<f/f6-f/f3<0.5.

8. The camera lens group according to claim 1, wherein a center thickness CT7 of the seventh lens on the optical axis and a spacing distance T67 of the sixth lens and the seventh lens on the optical axis meet 0.9<CT7/T67≤1.6.

9. The camera lens group according to claim 1, wherein a spacing distance T23 of the second lens and the third lens on the optical axis, a spacing distance T45 of the fourth lens and the fifth lens on the optical axis and a spacing distance T56 of the fifth lens and the sixth lens on the optical axis may meet 1.0<T56/(T23+T45)≤4.0.

10. The camera lens group according to claim 1, wherein a center thickness CT1 of the first lens on the optical axis and a sum ΣAT of spacing distances of any two adjacent lenses in the first lens to the seventh lens on the optical axis may meet 0.8<CT1/ΣAT<1.0.

11. The camera lens group according to claim 1, wherein the total effective focal length f of the camera lens group and a curvature radius R13 of an object-side surface of the seventh lens may meet −2.5<f/R13<−1.5.

12. The camera lens group according to claim 1, wherein a curvature radius R10 of an image-side surface of the fifth lens and a curvature radius R12 of an image-side surface of the sixth lens may meet −4.0<R12/R10<−1.5.

13. The camera lens group according to claim 1, wherein the total effective focal length f of the camera lens group, a curvature radius R3 of an object-side surface of the second lens and a curvature radius R4 of an image-side surface of the second lens may meet 2.5<f/(R3-R4)<3.5.

14. The camera lens group according to claim 1, wherein the total effective focal length f of the camera lens group, a curvature radius R5 of an object-side surface of the third lens and a curvature radius R6 of an image-side surface of the third lens may meet 0<f/R5-f/R6<0.5.

15. A camera lens group, sequentially comprising, from an object side to an image side along an optical axis:
    a first lens group with a positive refractive power, sequentially comprising, along the optical axis, a first lens, a second lens and a third lens with refractive power respectively; and
    a second lens group with a negative refractive power, sequentially comprising, along the optical axis, a fourth lens, a fifth lens, a sixth lens and a seventh lens with refractive power respectively, wherein
    a center thickness CT1 of the first lens on the optical axis and a sum EAT of spacing distances of any two adjacent lenses in the first lens to the seventh lens on the optical axis meet 0.8<CT1/ΣAT<1.0;
    a combined focal length f23 of the second lens and the third lens and the effective focal length f1 of the first lens meet −3.0<f23/f1≤−2.0.

16. The camera lens group according to claim 15, wherein a total effective focal length f of the camera lens group and an entrance pupil diameter (EPD) of the camera lens group meet f/EPD<1.4.

17. The camera lens group according to claim 15, wherein an effective focal length f1 of the first lens and a spacing distance T34 of the third lens and the fourth lens on the optical axis meet 3.0<f1/T34<5.0.

18. The camera lens group according to claim 15, wherein an entrance pupil diameter (EPD) of the camera lens group and THE center thickness CT1 of the first lens on the optical axis meet 2.5<EPD/CT1<3.0.

19. The camera lens group according to claim 15, wherein a total effective focal length f of the camera lens group and an effective focal length f1 of the first lens meet 1.2<f/f1<1.5.

* * * * *